US007814154B1

(12) United States Patent
Kandekar et al.

(10) Patent No.: US 7,814,154 B1
(45) Date of Patent: Oct. 12, 2010

(54) MESSAGE TRANSFORMATIONS IN A DISTRIBUTED VIRTUAL WORLD

(75) Inventors: Kunal Kandekar, Raleigh, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 493 days.

(21) Appl. No.: 11/768,668

(22) Filed: Jun. 26, 2007

(51) Int. Cl.
G06F 15/16 (2006.01)
A63F 13/00 (2006.01)

(52) U.S. Cl. .................... 709/205; 709/246; 463/42
(58) Field of Classification Search ........................ None
See application file for complete search history.

(56) References Cited

U.S. PATENT DOCUMENTS

| 5,109,483 | A | 4/1992 | Baratz et al. | |
|---|---|---|---|---|
| 5,838,909 | A | 11/1998 | Roy et al. | |
| 6,767,287 | B1 * | 7/2004 | Mcquaid et al. | 463/42 |
| 6,912,565 | B1 | 6/2005 | Powers et al. | |
| 6,951,516 | B1 * | 10/2005 | Eguchi et al. | 463/40 |
| 7,065,553 | B1 | 6/2006 | Chesley et al. | |
| 7,089,278 | B1 | 8/2006 | Churchill et al. | |
| 7,133,368 | B2 | 11/2006 | Zhang et al. | |
| 7,244,181 | B2 | 7/2007 | Wang et al. | |
| 7,245,620 | B2 | 7/2007 | Shankar | |
| 7,349,830 | B2 * | 3/2008 | Gilbert et al. | 703/2 |
| 7,421,708 | B2 | 9/2008 | Vass et al. | |
| 7,512,071 | B2 | 3/2009 | Goldschmidt et al. | |
| 7,688,761 | B2 | 3/2010 | Paramaguru | |
| 2001/0040895 | A1 | 11/2001 | Templin | |
| 2001/0052008 | A1 | 12/2001 | Jacobus | |
| 2002/0188678 | A1 * | 12/2002 | Edecker et al. | 709/204 |
| 2003/0177187 | A1 * | 9/2003 | Levine et al. | 709/205 |

(Continued)

FOREIGN PATENT DOCUMENTS

WO    WO 00/72169 A1    11/2000

(Continued)

OTHER PUBLICATIONS

Eric Karasuda et al., "Textual Annotation in a Head Tracked, Stereoscopic Virtual Design Environment," (article), Sep. 29, 2004, 10 pages, Proceedings of DETC'04 2004 ASME Design Engineering Technical Conferences, Salt Lake City, Utah, USA.

(Continued)

*Primary Examiner*—John B. Walsh
(74) *Attorney, Agent, or Firm*—Withrow & Terranova, PLLC

(57) ABSTRACT

A system and method are provided for transforming messages propagated in a distributed virtual world such as a Peer-to-Peer (P2P) virtual world. The disturbed virtual world is hosted by a number of peer servers, wherein each peer server hosts a cell, or virtual space, within the virtual world. During message propagation, a peer server receives a message from a sending peer server hosting a virtual space neighboring a virtual space of the peer server. The peer server then identifies one or more transformation rules for transforming the message in a manner that is consistent with the state or properties of its virtual space and applies the transformation rules either directly or indirectly. After the transformation rules are applied, the peer server propagates the message to one or more of its neighboring peer servers.

32 Claims, 24 Drawing Sheets

U.S. PATENT DOCUMENTS

| | | | |
|---|---|---|---|
| 2004/0002342 | A1 | 1/2004 | Goldberg et al. |
| 2004/0152519 | A1 | 8/2004 | Wang et al. |
| 2004/0215756 | A1 | 10/2004 | VanAntwerp et al. |
| 2005/0052994 | A1 | 3/2005 | Lee |
| 2005/0054447 | A1 | 3/2005 | Hiroyama et al. |
| 2006/0123127 | A1 | 6/2006 | Littlefield |
| 2006/0287105 | A1* | 12/2006 | Willis .................... 463/42 |
| 2007/0094325 | A1* | 4/2007 | Ih et al. ................ 709/203 |
| 2007/0184903 | A1 | 8/2007 | Liu et al. |
| 2007/0186212 | A1 | 8/2007 | Mazzaferri et al. |
| 2007/0270225 | A1 | 11/2007 | Wang et al. |
| 2007/0294387 | A1 | 12/2007 | Martin |
| 2008/0063002 | A1 | 3/2008 | Zheng et al. |
| 2008/0090659 | A1* | 4/2008 | Aguilar et al. .......... 463/42 |
| 2008/0109519 | A1 | 5/2008 | Aaltonen et al. |
| 2008/0201321 | A1 | 8/2008 | Fitzpatrick et al. |
| 2009/0113421 | A1 | 4/2009 | Hamilton, II et al. |
| 2009/0124387 | A1 | 5/2009 | Perlman et al. |
| 2009/0141047 | A1 | 6/2009 | Bates et al. |
| 2009/0276707 | A1 | 11/2009 | Hamilton, II et al. |

FOREIGN PATENT DOCUMENTS

| | | | |
|---|---|---|---|
| WO | | 03/081447 A1 | 10/2003 |

OTHER PUBLICATIONS

Chris Gauthierdickey et al., "Event Ordering and Congestion Control for Distributed Multiplayer Games," (article), May 14, 2005, 10 pages.
Dan Power, "What are the best Second Life resources for communications-driven decision support?", (article), Aug. 19, 2007, 5 pages. http://dssresources.com/faq/index.php?action=artikel&id=139.
Geser Hans, "A very real Virtual Society," (article), Apr. 2007, 21 pages, In: Sociology in Switzerland: Towards Cybersociety and Vireal Social Relations, Online Publikationen, Zuerich, http://socio.ch/intcom/t_hgeser18.htm.
No Author, "Surrender—The Sky Is Falling," (article), obtained Jun. 30, 2008, 5 pages, http://stern.aen.walkerart.org/artifacts.html.
No Author, "About This Site—Thottbot: World of Warcraft," (website), obtained Feb. 27, 2009, http://thottbot.com/about.
No Author, "About Us—Wowhead," (website), obtained Feb. 27, 2009, 3 pages, http://www.wowhead.com/?aboutus.
No Author, "Allakhazam.com," (website), obtained Feb. 27, 2009, 18 pages, http://www.allakhazam.com/.
No Author, "Second Life—What is Second Life?", (website), obtained Feb. 27, 2009, 2 pages, http://secondlife.com/whatis/.
Paul Beskow et al., "Latency Reduction in Massively Multi-player Online Games by Partial Migration of Game State," (article), Sep. 4-7, 2007, 10 pages, Second International Conference on Internet Technologies and Applications.
Shun-Yun Hu et al., "VON: A Scalable Peer-to-Peer Network For Virtual Environments," (article), Jul./Aug. 2006, pp. 22-31, vol. 20, issue 4, IEEE Network.
Shun-Yun Hu et al., "Scalable Peer-to-Peer Networked Virtual Environment," in Proc. 3rd ACM SIGCOMM 2004 workshops on NetGames '04, Aug. 2004, pp. 129-133.
Takuji Iimura et al., "Zoned Federation of Game Servers: a Peer-to-peer Approach to Scalable Multi-player Online Games," in Proc. 3rd ACM SIGCOMM 2004 workshops on NetGames '04, Aug. 2004, pp. 116-120.
Jouni Smed et al., "A Review on Networking and Multiplayer Computer Games," Technical Report No. 454, Turku Centre for Computer Science, Apr. 2002.
Bjorn Knutsson et al., "Peer-to-Peer Support for Massively Multiplayer Games," In the 23rd Conference of the IEEE Communications Society (INFOCOM '04), Hong Kong, China, Mar. 2004.
Jean-Sebastien Boulanger et al., "Comparing Interest Management Algorithms for Massively Multiplayer Games," Proceedings of the 5th ACM SIGCOMM Workshop on Network and System Support for Games, Oct. 30-31, 2006, New York: ACM Press, 2006.
Uni-verse Home, www.uni-verse.org, printed Jun. 15, 2007.
Main Page—Solipsis, http://solipsis.netofpeers.net/wiki2/index.php/Main_Page, printed Feb. 6, 2007.
De Oliveira, Jauvane C. et al., "VELVET: An Adaptive Hybrid Architecture for VEry Large Virtual EnvironmenTs," (article), Dec. 2003, v. 12 No. 6, pp. 555-580.
Adwait Tumbde et al., "A Voronoi Partitioning Approach to Support Massively Multiplayer Online Games," (article), 2004, 8 pages, CS 740 Project, The University of Wisconsin, Madison.
Amjad Akkawi et al., "A Mobile Gaming Platform for the IMS," (article), 2004, pp. 77-87, In SIGCOMM'04 Workshops, ACM, http://conferences.sigcomm.org/sigcomm/2004/workshop_papers/net501-akkawi.pdf.
Mojtaba Hosseini et al., "Visibility-based Interest Management in Collaborative Virtual Environments," CVE 2002: pp. 143-144.
"Multiverse Technology: An Overview," http://www.multiverse.net/platform/whitepapers/mv_overview.pdf.

* cited by examiner

MESSAGE TRANSFORMATIONS IN A DISTRIBUTED VIRTUAL WORLD

FIELD OF THE INVENTION

The present invention relates to a distributed virtual world and more specifically relates to transforming messages propagated among servers in a distributed virtual world.

BACKGROUND OF THE INVENTION

Decentralized Peer-to-Peer (P2P) virtual worlds are an emerging technology wherein a number of peer servers host virtual spaces within the virtual world. If virtual objects within the virtual world have auras and Areas of Interest (AOIs) that span multiple virtual spaces, messages such as event messages, content messages, and content update messages originating from virtual objects in a virtual space hosted by a peer server must be propagated to other peer servers hosting other virtual spaces in the virtual world in which the messages are relevant. Likewise, messages originating in virtual spaces hosted in other peer servers that are of interest to virtual objects within the virtual space hosted by the peer server must be propagated to the peer server. Thus, there is a need for a system and method for efficiently propagating messages in a decentralized P2P virtual world.

SUMMARY OF THE INVENTION

The present invention relates to transforming messages propagated in a distributed virtual world such as a Peer-to-Peer (P2P) virtual world. The disturbed virtual world is hosted by a number of peer servers, wherein each peer server hosts a cell, or virtual space, within the virtual world. During message propagation, a peer server receives a message from a sending peer server hosting a virtual space neighboring a virtual space of the peer server. The peer server then identifies one or more transformation rules for transforming the message in a manner that is consistent with the state or properties of its virtual space and applies the transformation rules either directly or indirectly. After the transformation rules are applied, the peer server propagates the message to one or more of its neighboring peer servers according to a defined message flow path for the message.

For example, the message may be a visual message propagated from a virtual object in the virtual space of the sending peer server to one of the neighboring peer servers via the peer server, wherein the visibility of the virtual object from the virtual space of the neighboring peer server is obscured by weather conditions such as rain or fog in the virtual space of the peer server. As such, when the peer server receives the message, the peer server identifies one or more transformation rules for transforming the visual content of the message in a manner that is consistent with the weather conditions in its virtual space and applies the transformation rules. Thereafter, the one or more transformation rules are applied to the message either at the peer server or a subsequent node in the message flow path for the message such as, for example, the neighboring peer server or a client associated with the neighboring peer server responsible for rendering the virtual world to a user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
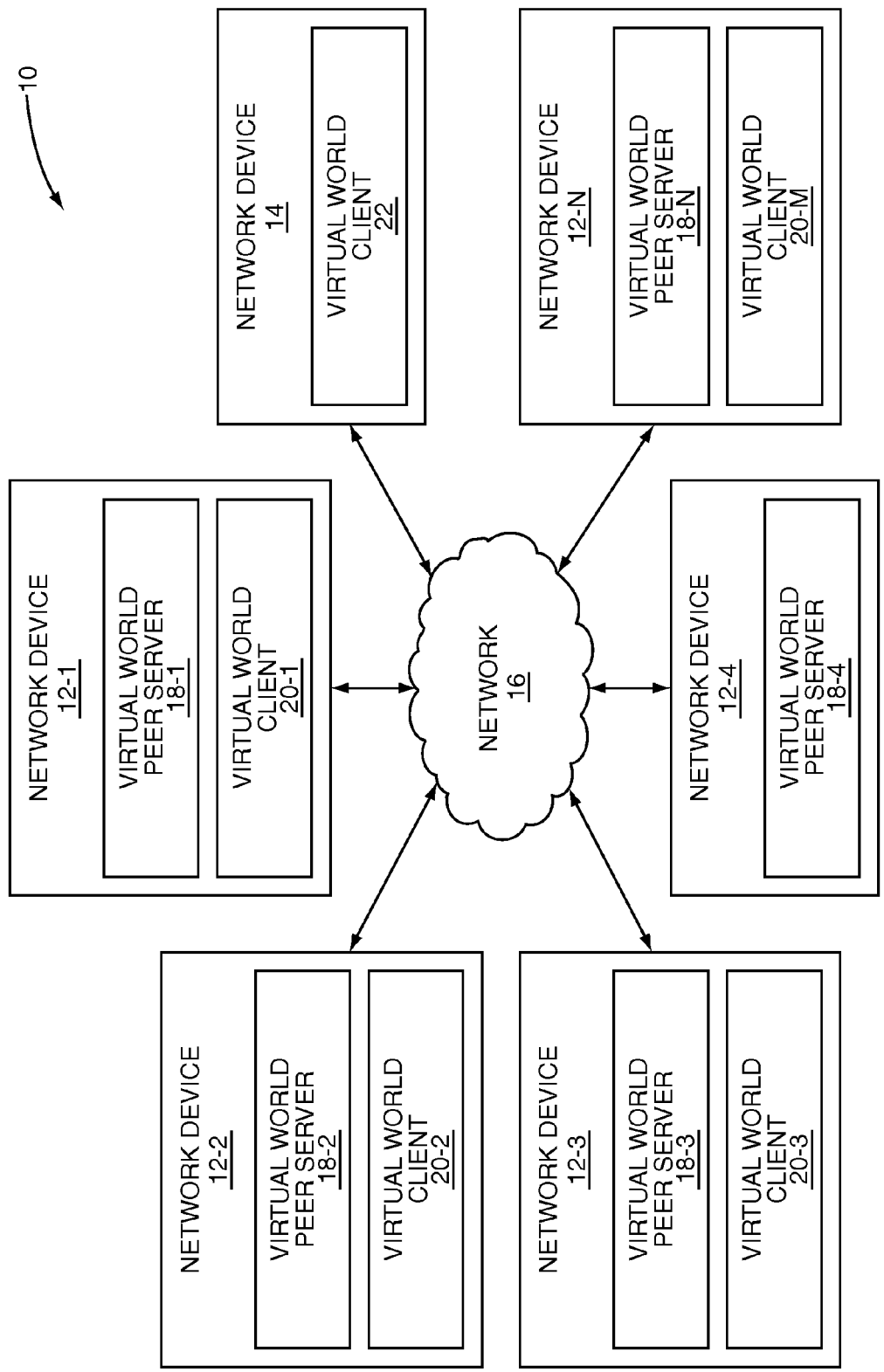
FIG. 1 illustrates a system 10 for implementing a Peer-to-Peer (P2P) virtual world according to one embodiment of the present invention.
Figure 9:
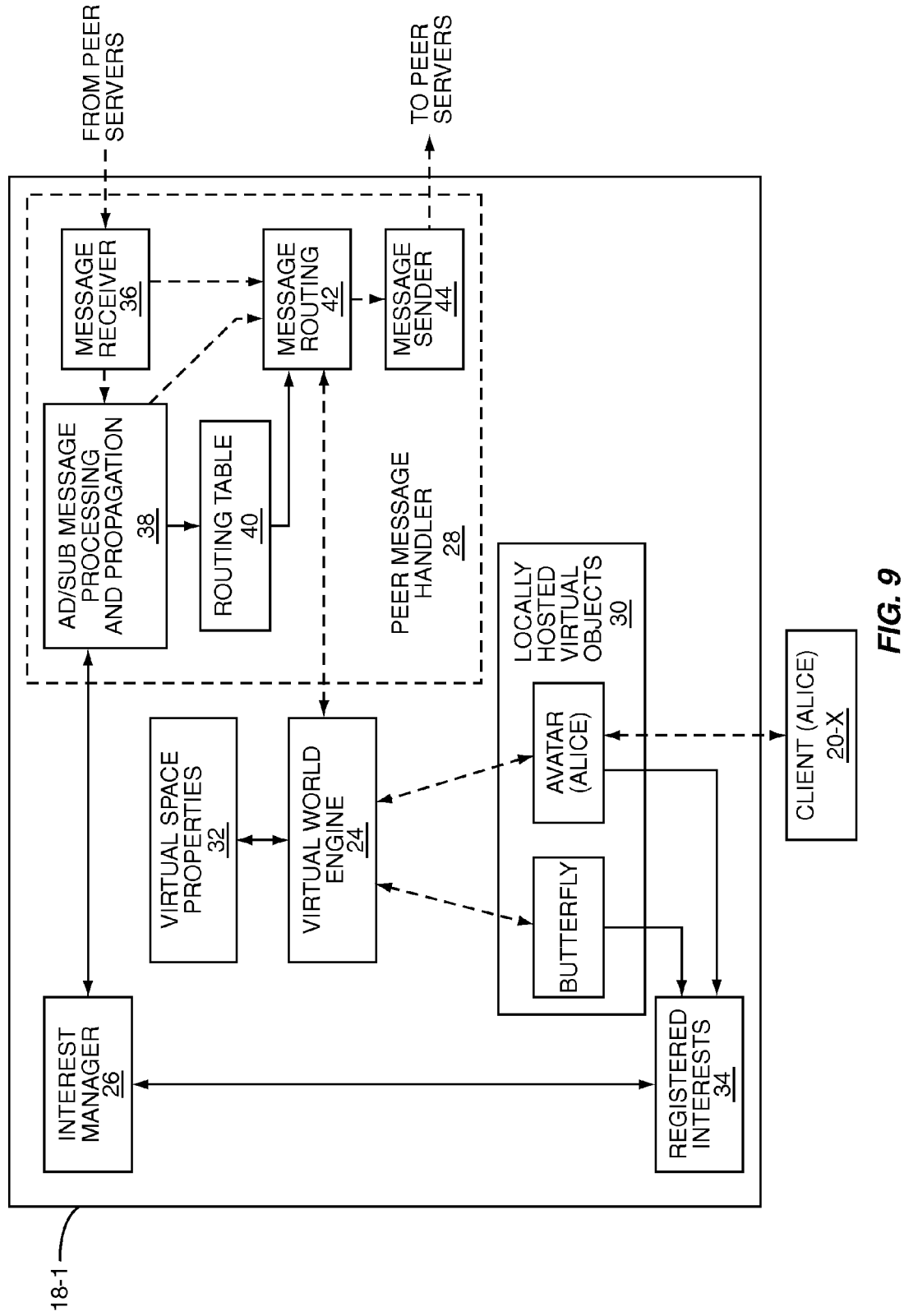
Figure 10:
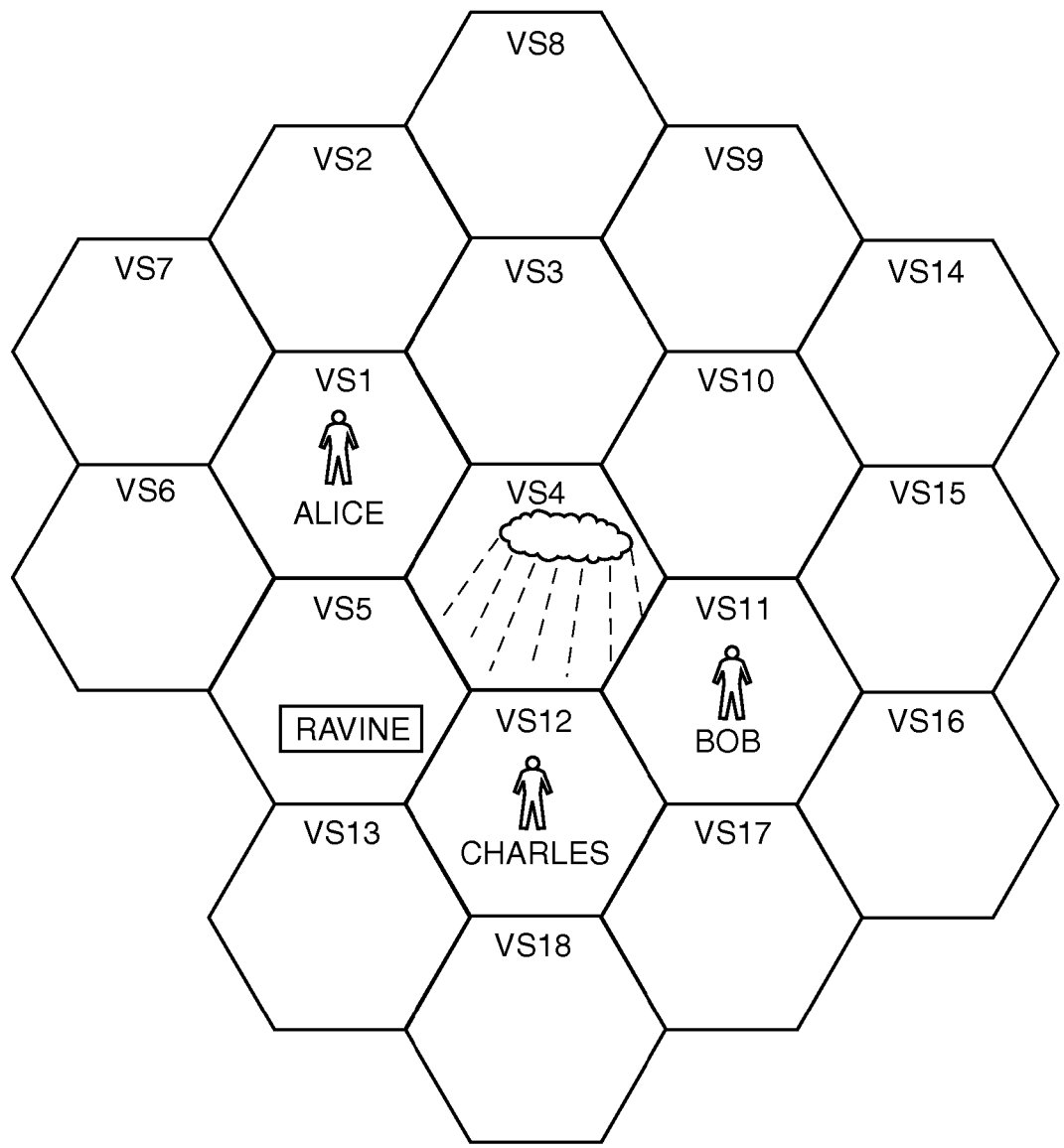
Figure 11A:
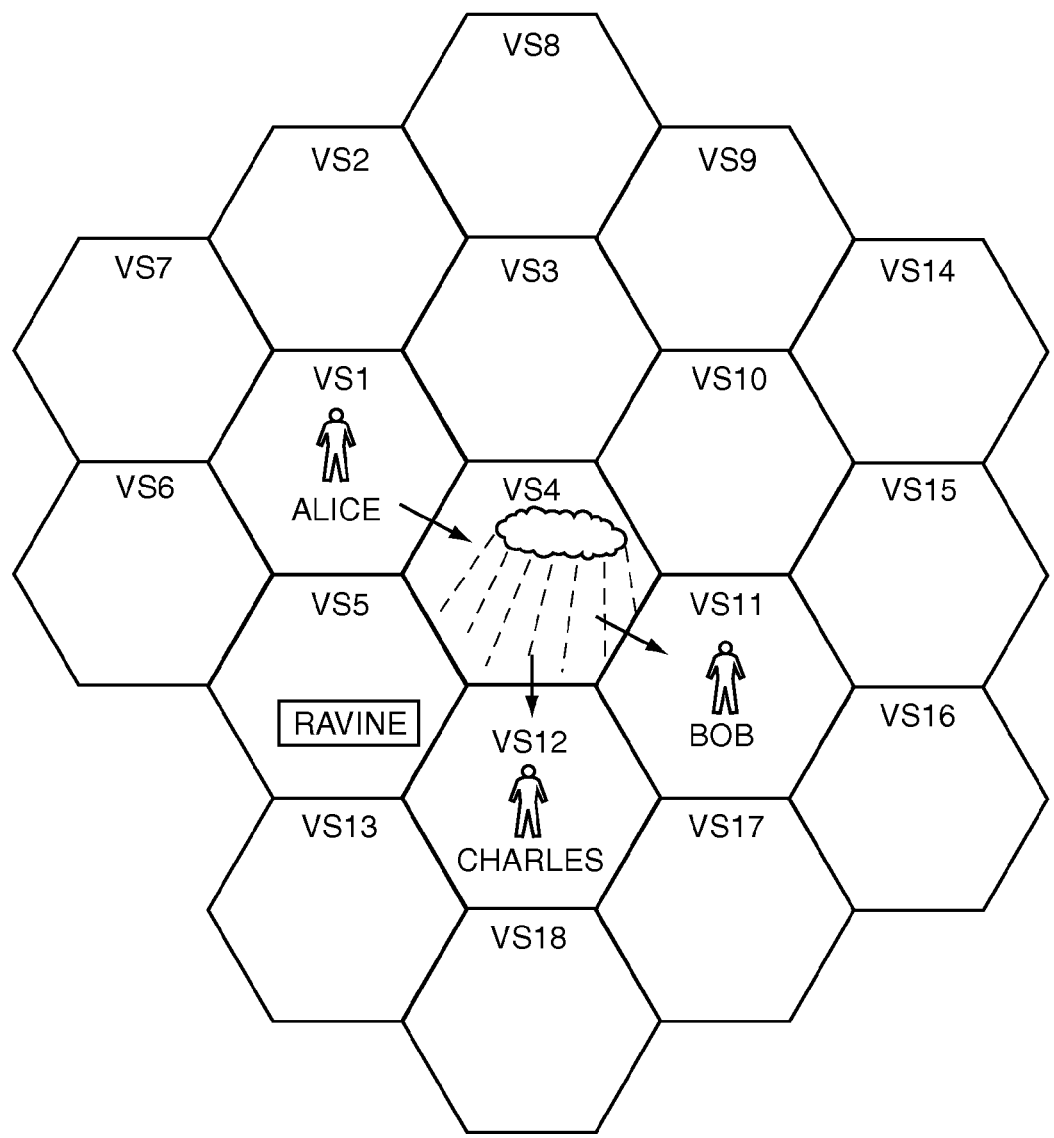
Figure 11B:
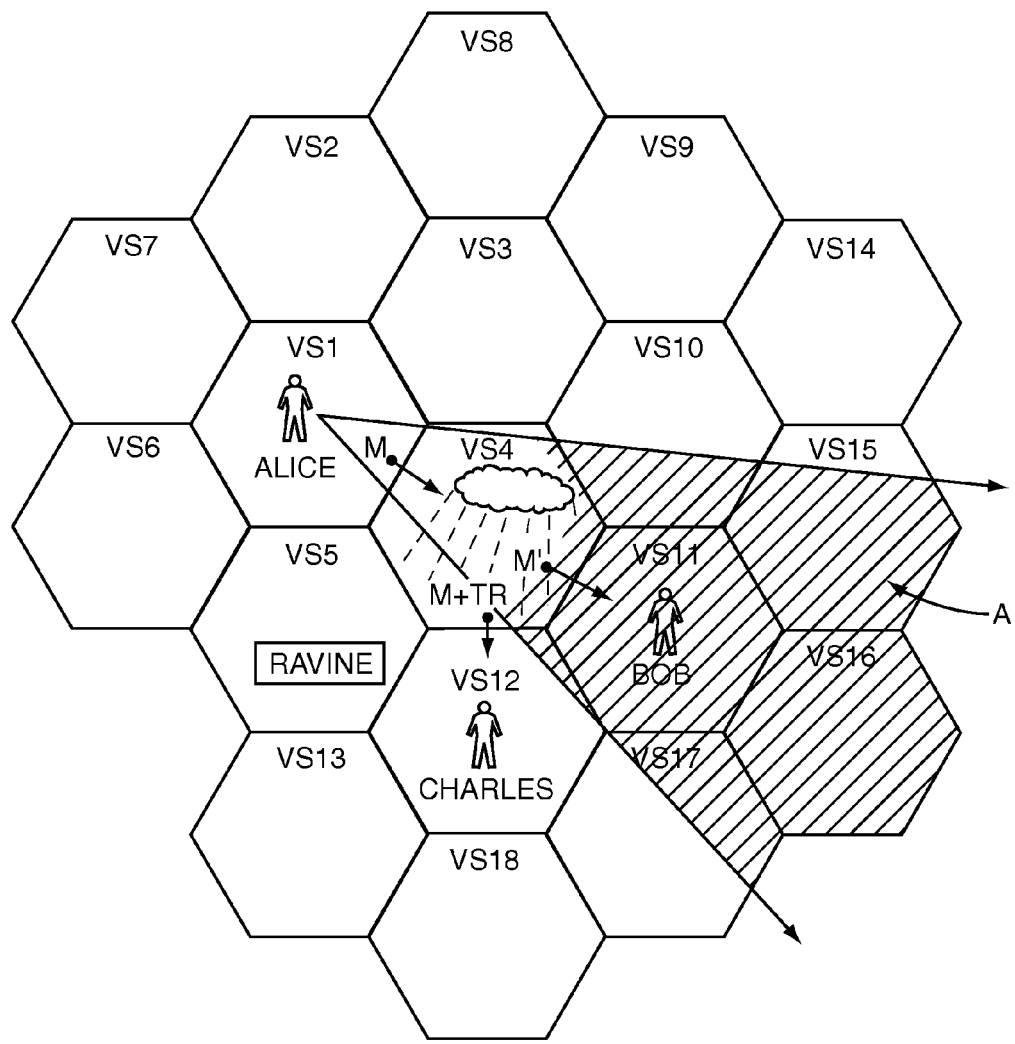
Figure 11C:
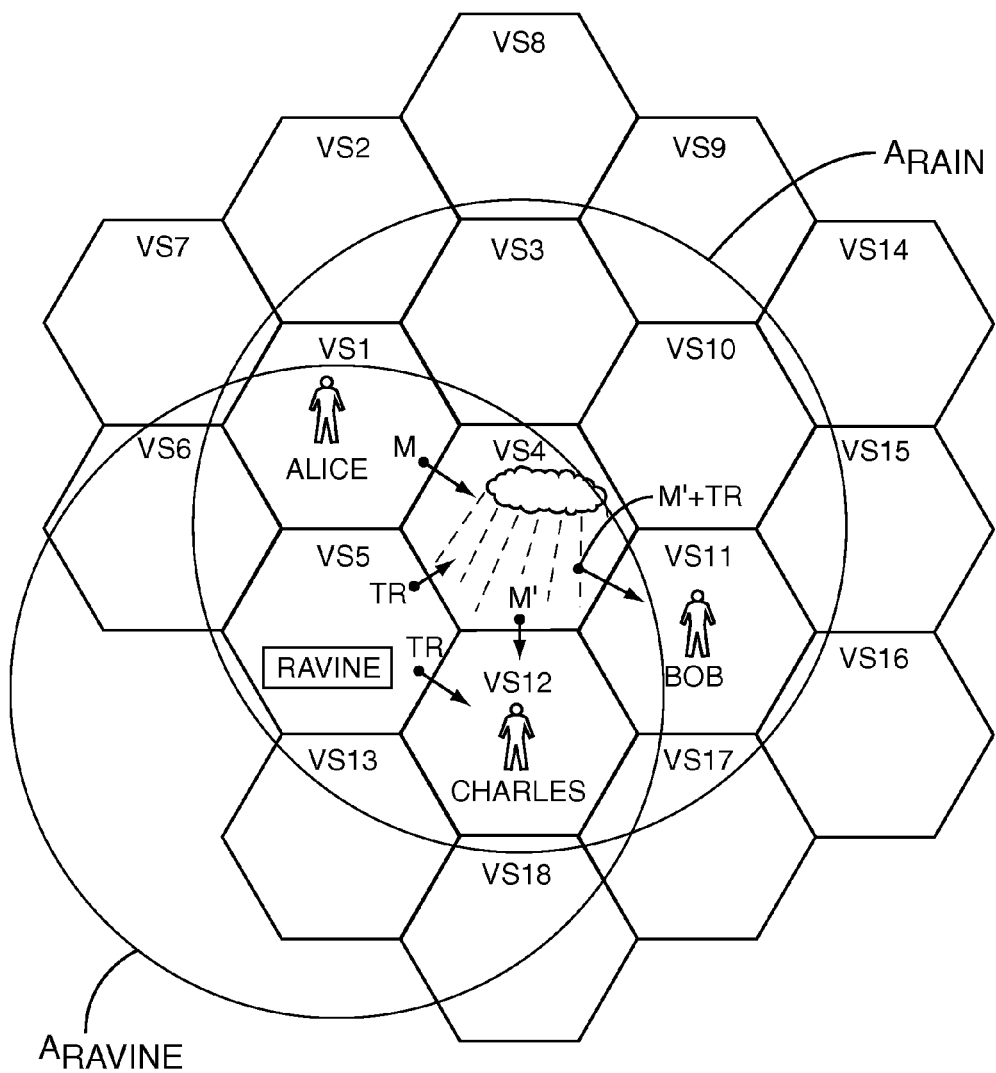
Figure 12:
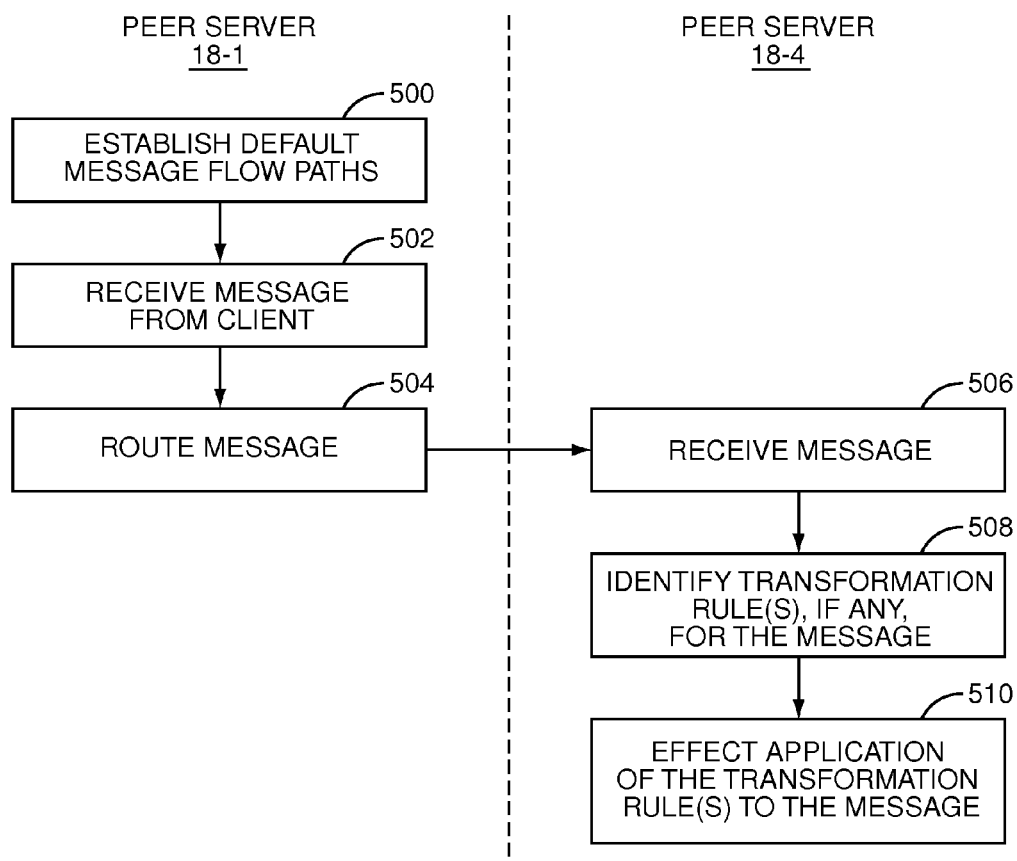
Figure 13A:
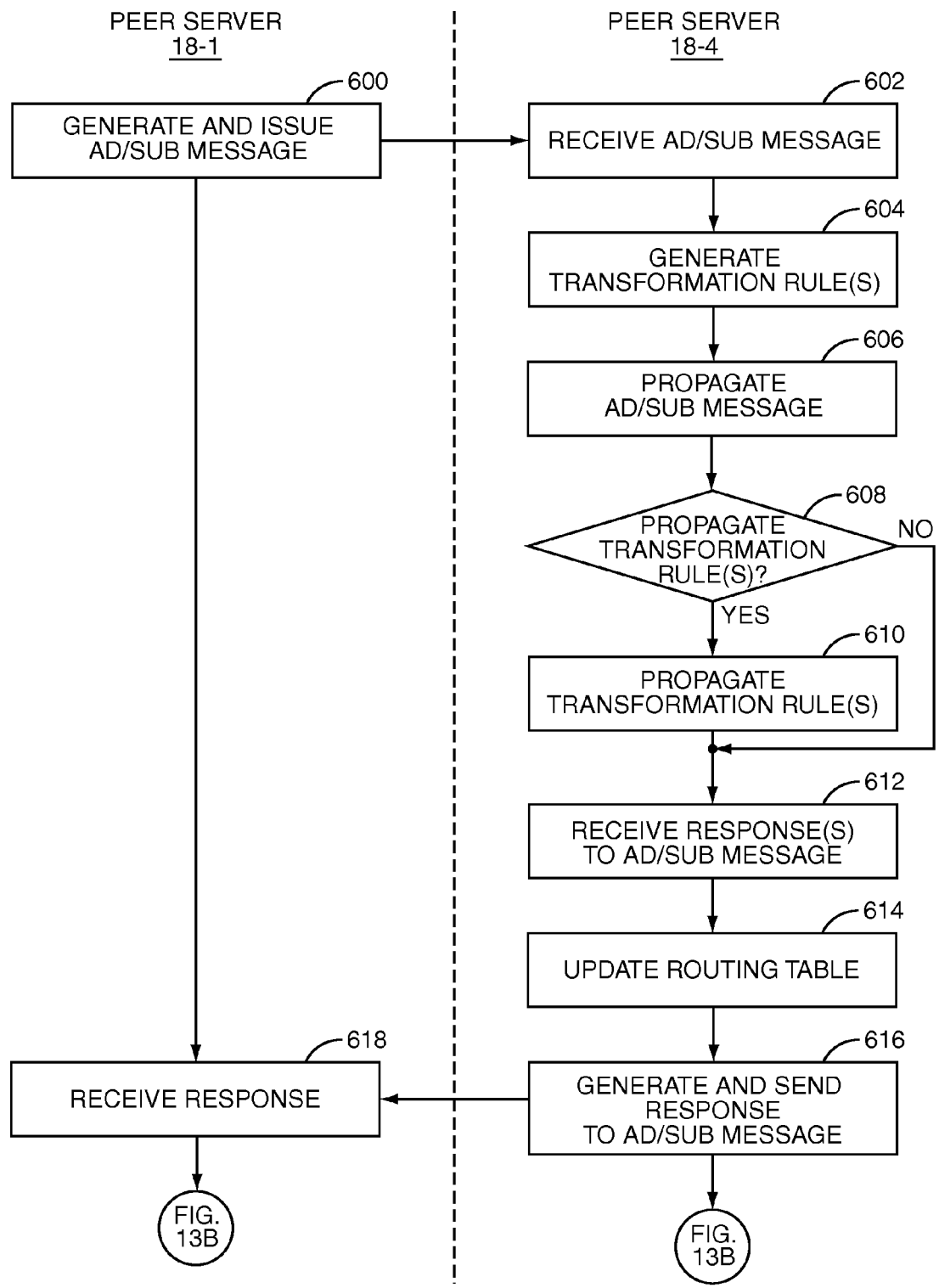
Figure 13B:
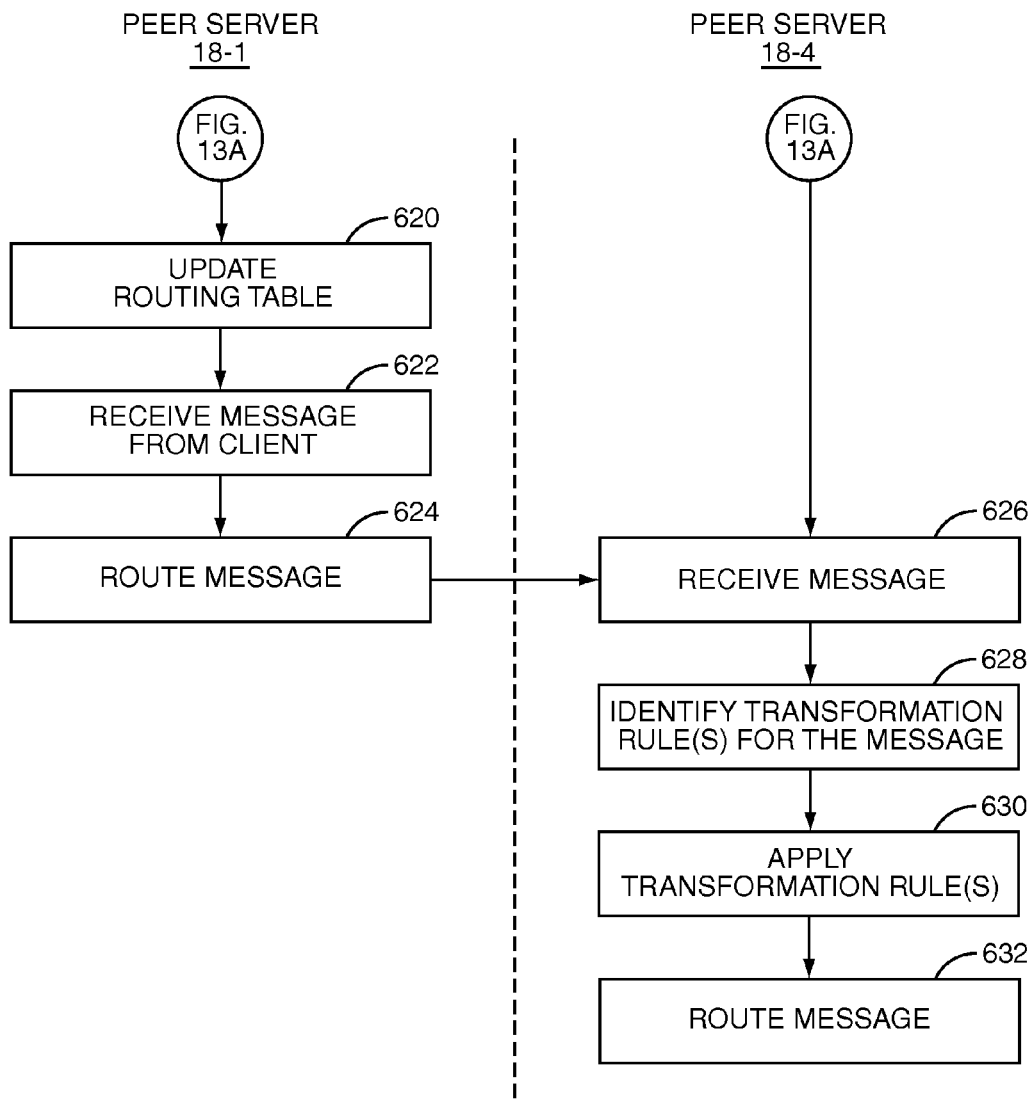
Figure 14:
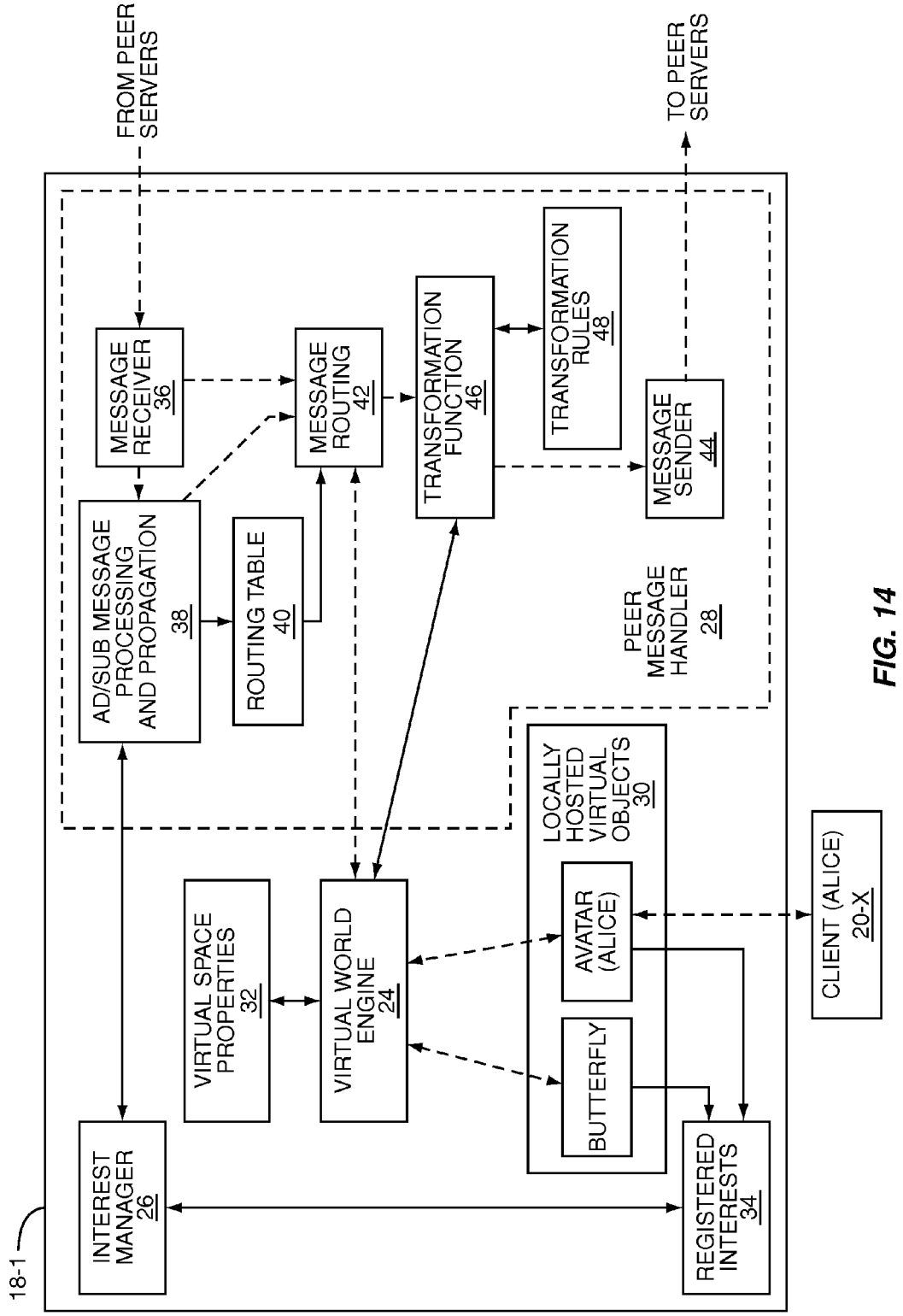
Figure 15A:
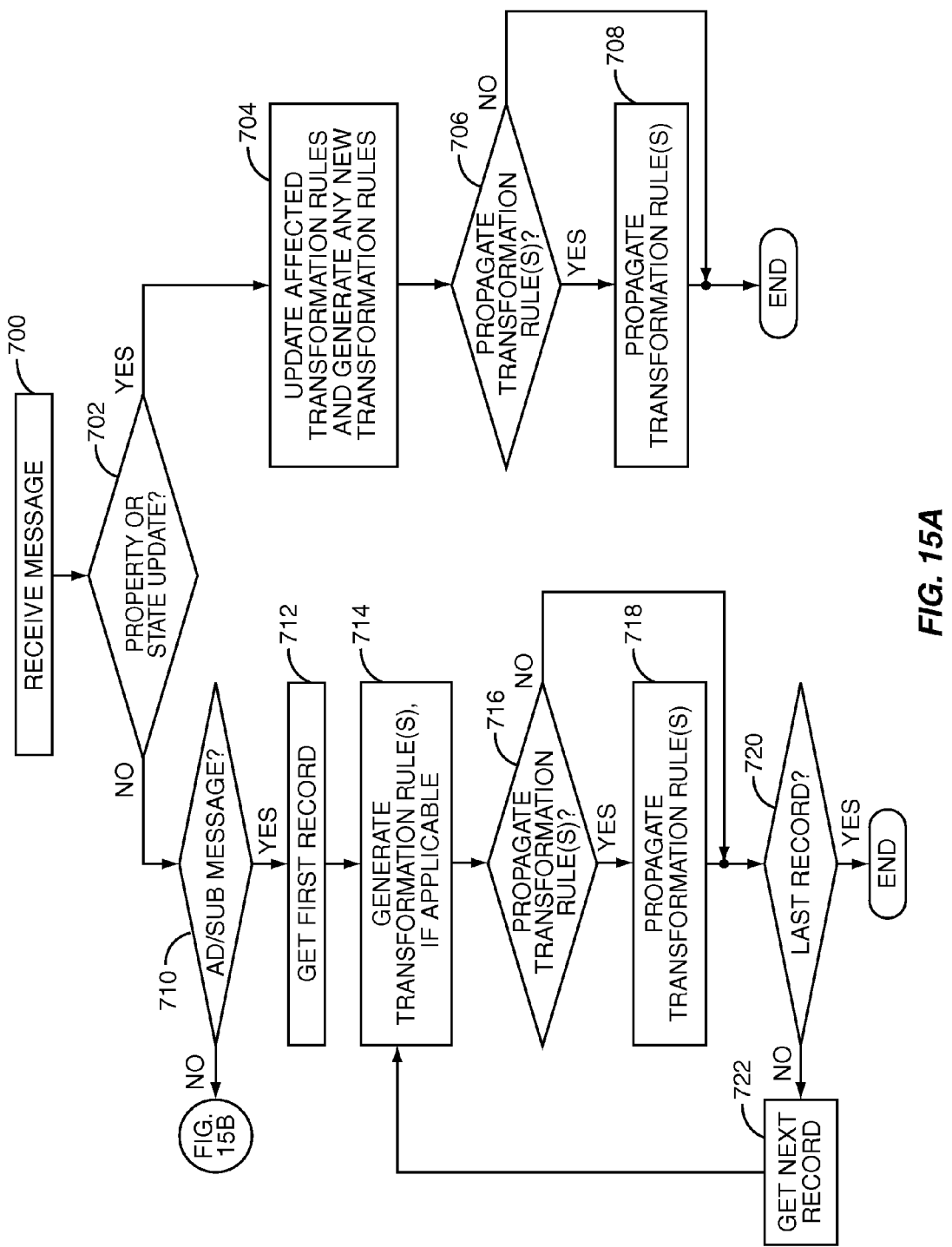
Figure 15B:
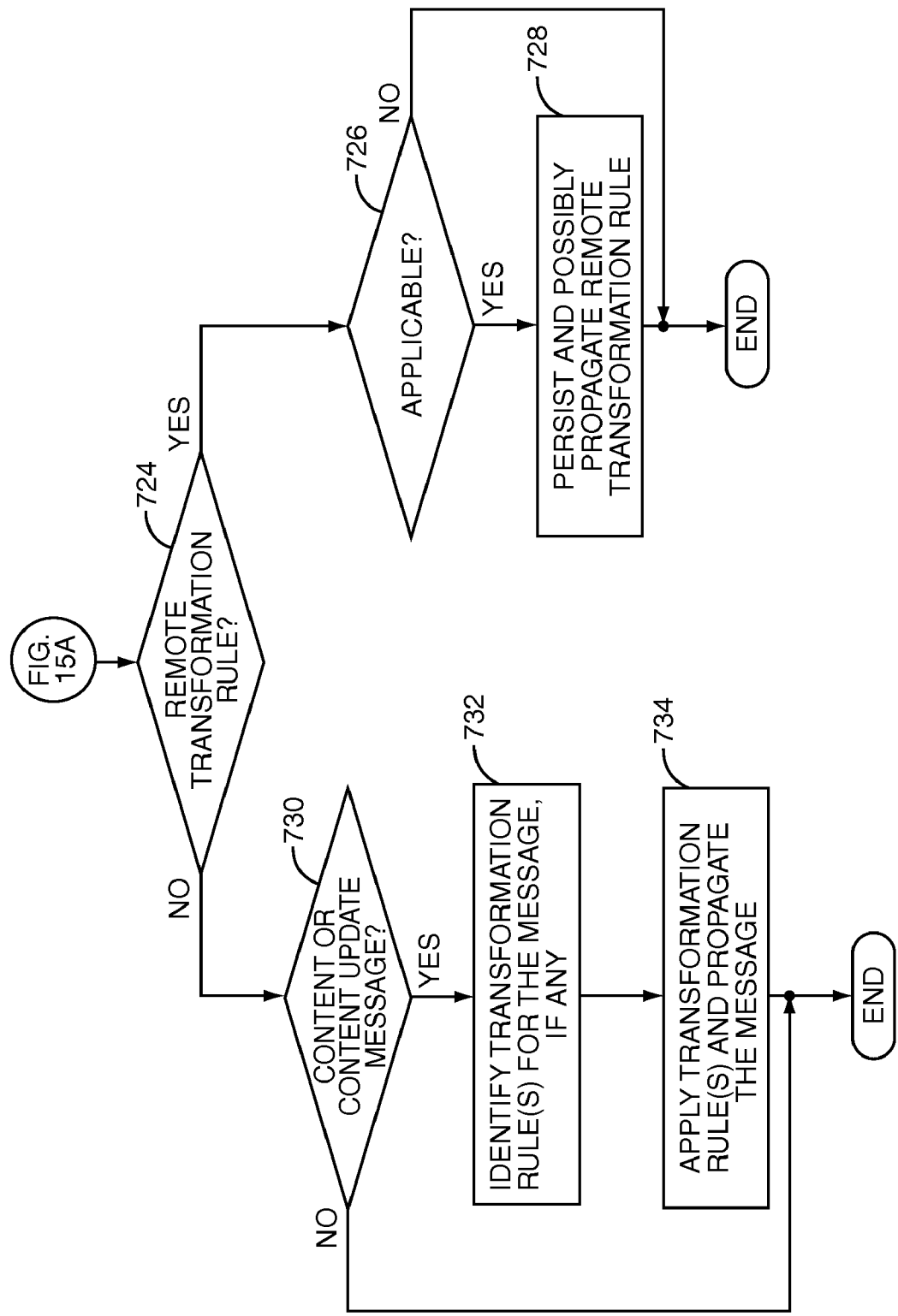
Figure 16:
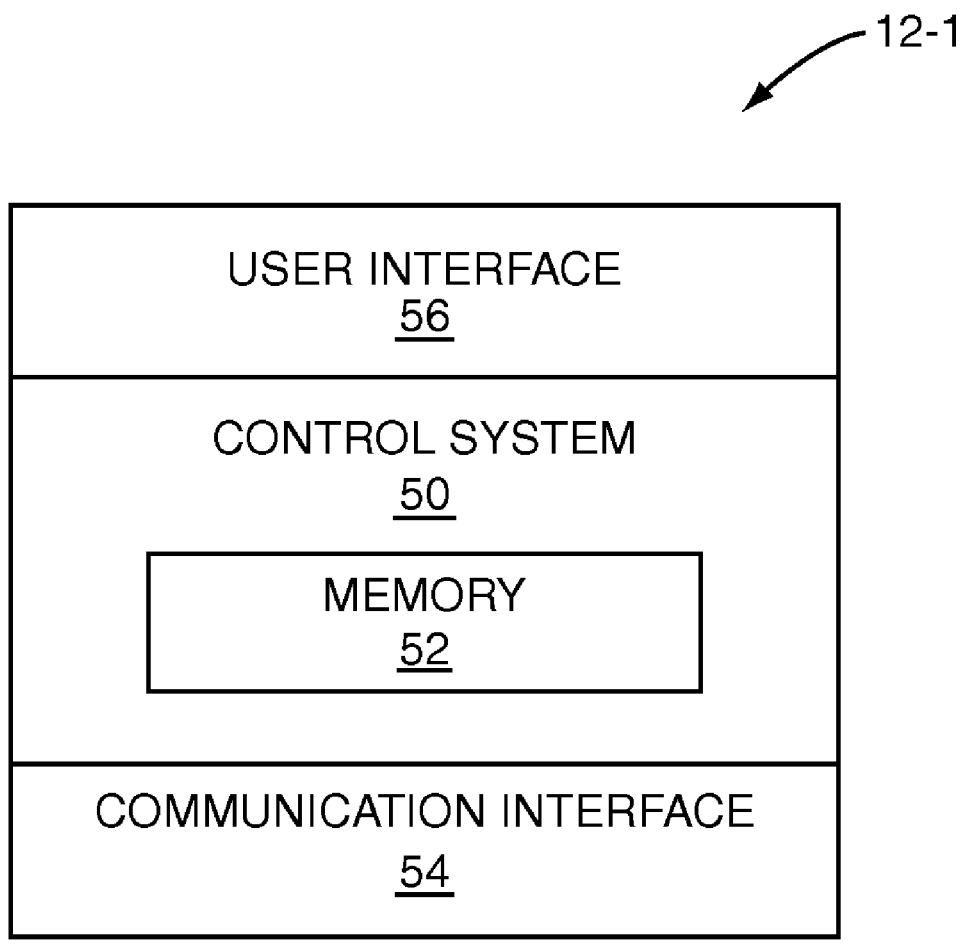

FIGS. 8A-8D graphically illustrate process of issuing and responding to an ad/sub message in order to establish message flow paths for messages produced and consumed by virtual objects within a virtual space hosted by a peer server according to one embodiment of the present invention;

FIG. 9 is a block diagram of a peer server according to one embodiment of the present invention;

FIG. 10 illustrates a further optimization of the message propagation scheme wherein a message is transformed in a manner that is consistent with the states and properties of the virtual spaces affecting the message according to one embodiment of the present invention;

FIGS. 11A-11C graphically illustrate the message transformation process according to one embodiment of the present invention;

FIG. 12 illustrates the message transformation process according to one embodiment of the present invention;

FIGS. 13A-13B illustrate the message transformation process according to another embodiment of the present invention;

FIG. 14 is a block diagram of a peer server implementing the message transformation scheme according to one embodiment of the present invention;

FIGS. 15A-15B illustrate the operation of the message transformation function of FIG. 14 according to one embodiment of the present invention; and FIG. 16 is a block diagram of one of the network devices of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates an exemplary system 10 for implementing a Peer-to-Peer (P2P) virtual world incorporating the message propagation scheme of the present invention. The virtual world may be, for example, a virtual world similar to Second Life or a Massively Multiplayer Online Role Playing Game (MMORPG). It should be noted that while the description herein focuses on a P2P virtual world, the present invention is equally applicable to any type of distributed virtual world. In general, the system 10 includes a number of network devices 12-1 through 12-N and optionally 14 communicatively coupled by a network 16. The network 16 may be a Wide Area Network (WAN), Local Area Network (LAN), or a combination thereof and may include wired components, wireless components, or both wired and wireless components. For example, the network 16 may be the Internet. The network devices 12-1 through 12-N and 14 communicate in a P2P fashion via a P2P overlay network built on top of the network 16.

The network devices 12-1 through 12-N and 14 may each be, for example, a personal computer; a mobile device such as a Personal Digital Assistant (PDA) or mobile telephone; a mobile gaming device similar to a Nintendo DS® or PSP® (PlayStation Portable®); a gaming console; or the like. The network devices 12-1 through 12-N include virtual world peer servers 18-1 through 18-N (hereinafter "peer servers 18-1 through 18-N"). The peer servers 18-1 through 18-N may be implemented in software, hardware, or a combination thereof. As discussed below, each of the peer servers 18-1 through 18-N hosts a cell of the virtual world, where the cell is also referred to herein as a virtual space. Users associated with the peer servers 18-1 through 18-N may customize or create their virtual spaces by, for example, creating buildings, altering the terrain or landscape, defining weather or weather patterns, or the like. In one embodiment, a new cell is created for each of the peer servers 18-1 through 18-N when they are first registered with the system 10. When, for example, the peer server 18-1 is offline, the corresponding cell of the virtual world may cease to exist until the peer server 18-1 is again online. Alternatively, when the peer server 18-1 is offline, the cell of the virtual world typically hosted by the peer server 18-1 may be temporarily hosted by one of the other peer servers 18-2 through 18-N. In another embodiment, a central system assigns the cells of the virtual world to the peer servers 18-1 through 18-N. The assignment may be static such that, for example, the peer server 18-1 typically hosts a particular cell of the virtual world. When the peer server 18-1 is offline, the corresponding cell of the virtual world may cease to exist or be temporarily hosted by one of the other peer servers 18-2 through 18-N. As another alternative, the central system may dynamically assign the cells of the virtual world to the peer servers 18-1 through 18-N as they come online and go offline.

In this example, the network devices 12-1, 12-2, 12-3, and 12-N also include virtual world clients 20-1 through 20-M, which are hereafter referred to as clients 20-1 through 20-M. Note that, in this example, one or more network devices such as the network device 12-4 may include a peer server but not a client. The clients 20-1 through 20-M may be implemented in software, hardware, or a combination thereof. The clients 20-1 through 20-M enable users of the network devices 12-1, 12-2, 12-3, and 12-N to view and interact with the virtual world. More specifically, in the preferred embodiment, the users are enabled to control corresponding avatars to move within and interact with the virtual world.

In addition, in this example, the network device 14 includes a virtual world client 22, which is hereafter referred to as a client 22. Note that while only the network device 14 is illustrated, the system 10 may include any number of network devices having a client but not a peer server. The client 22 may be implemented in software, hardware, or a combination thereof. The client 22 enables a user of the network device 14 to view and interact with the virtual world.

Figure 2:
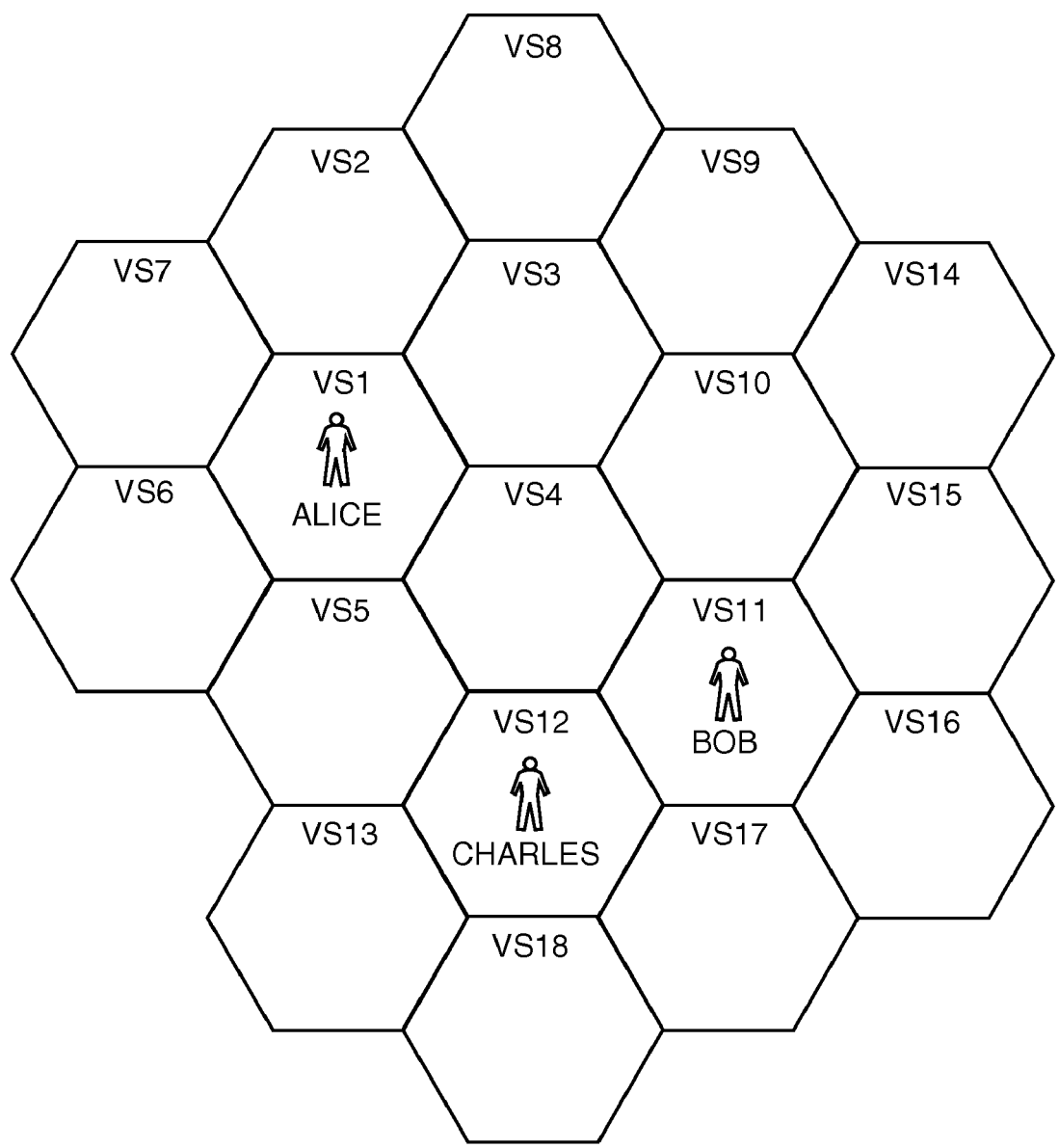
FIG. 2 illustrates a number of virtual spaces of the virtual world hosted by corresponding peer servers according to one embodiment of the present invention.

FIG. 2 illustrates a portion of the virtual world hosted by corresponding peer servers. In this example, eighteen cells, or virtual spaces, VS1-VS18 are illustrated, where each of the cells VS1-VS18 are hexagonally shaped and of equal size. However, the present invention is not limited thereto. Each of the virtual spaces of the virtual world may be any shape and size. In this example, an avatar of a user Alice is currently within the virtual space VS1, an avatar of a user Bob is currently within the virtual space VS11, and an avatar of user Charles is currently within the virtual space VS12.

Figure 3:
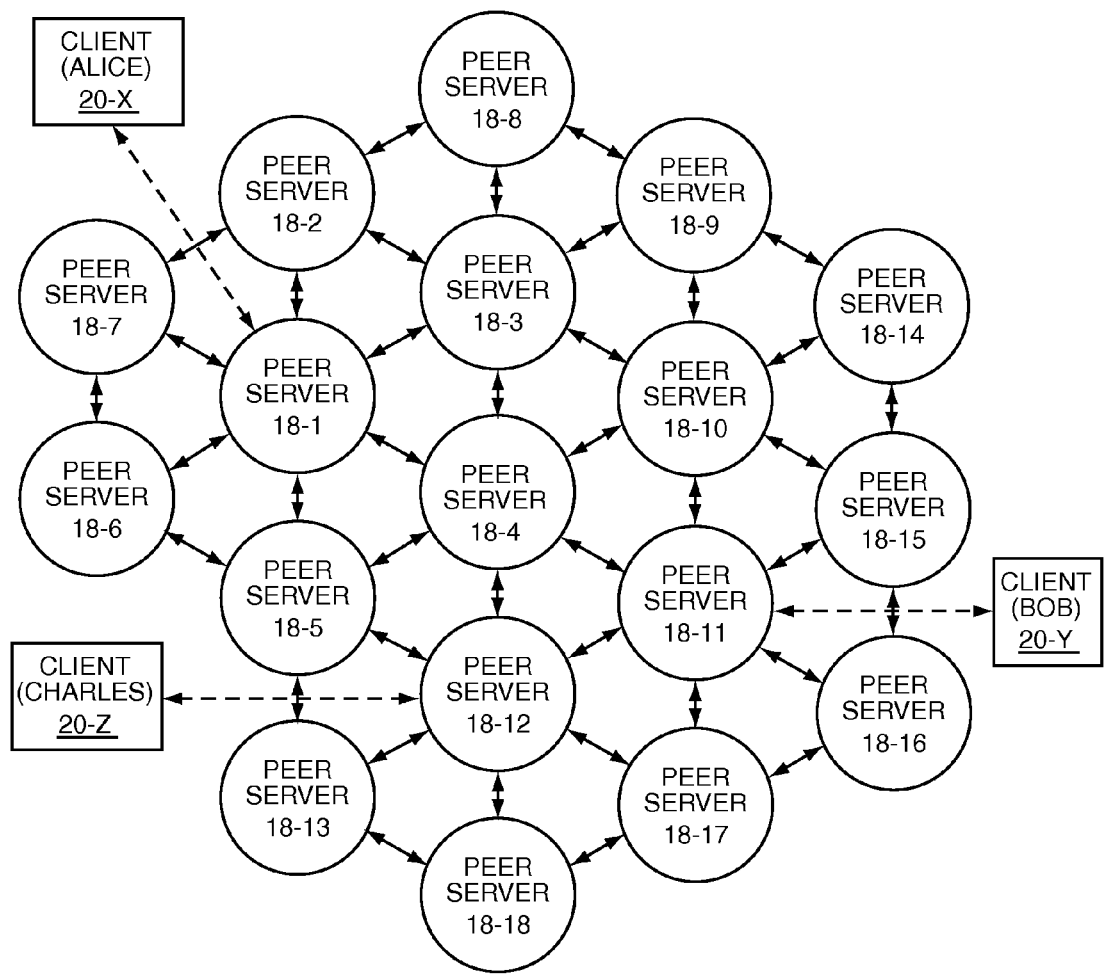
FIG. 3 illustrates a number of peer servers hosting the virtual spaces of FIG. 2 according to one embodiment of the present invention.

The virtual spaces VS1-VS18 are hosted by peer servers 18-1 through 18-18, which are illustrated in FIG. 3. The virtual space VS1 is hosted by the peer server 18-1, the virtual space VS2 is hosted by the peer server 18-2, etc. The peer servers 18-1 through 18-18 are communicatively coupled by the P2P overlay network as illustrated. Using the peer server 18-1 as an example, the peer server 18-1 is communicatively coupled to each of the peer servers 18-2 through 18-7 hosting neighboring virtual spaces VS2-VS7 in the virtual world via corresponding P2P communication channels. Note that the peer servers 18-2 through 18-7 are also referred to herein as the neighboring peer servers of the peer server 18-1. In a similar fashion, the peer servers 18-2 through 18-18 are communicatively coupled to their neighboring peer servers via P2P communication channels.

In addition, because the avatar of the user Alice is currently within the virtual space VS1, the corresponding client, which in this example is the client 20-X, is communicatively coupled to the peer server 18-1 hosting the virtual space VS1. While within the virtual space VS1, the client 20-X interacts with the virtual world via the peer server 18-1. Likewise, because the avatar of the user Bob is currently within the virtual space VS11, the corresponding client, which in this example is the client 20-Y, is communicatively coupled to the peer server 18-11 hosting the virtual space VS11. While within the virtual space VS11, the client 20-Y interacts with the virtual world via the peer server 18-11. Lastly, because the avatar of the user Charles is currently within the virtual space VS12, the corresponding client, which in this example is the client 20-Z, is communicatively coupled to the peer server 18-12 hosting the virtual space VS12. While within the virtual space VS12, the client 20-Z interacts with the virtual world via the peer server 18-12. Note that X, Y, and Z may each be any integer from 1 to M. Further, note, in another embodiment, one of the avatars may alternatively be associated with the client 22 of the network device 14.

If, for example, the user Alice moves her avatar from the virtual space VS1 to the virtual space VS2, the client 20-X disconnects from the peer server 18-1 hosting the virtual space VS1 and connects to the peer server 18-2 hosting the virtual space VS2. Then, while Alice's avatar is in the virtual space VS2, the client 20-X interacts with the virtual world via the peer server 18-2.

Figure 4:
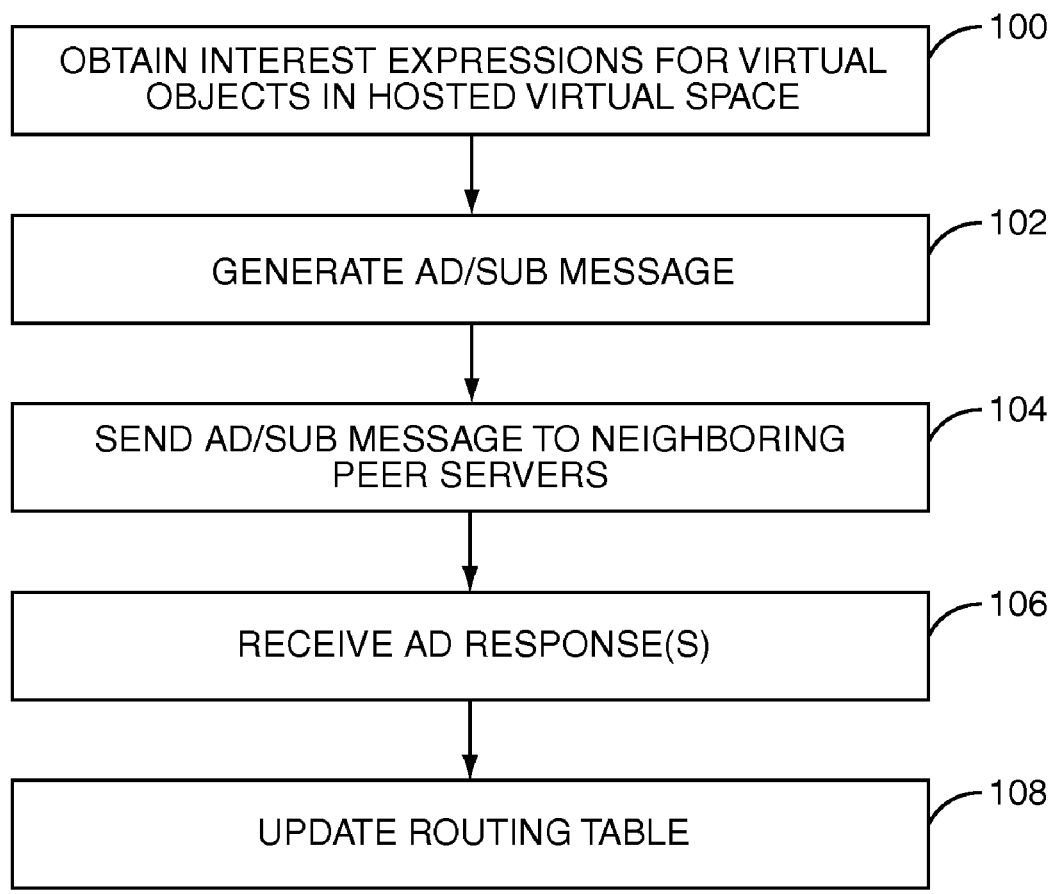
FIG. 4 illustrates the operation of a peer server issuing an advertisement/subscription (ad/sub) message according to one embodiment of the present invention.

FIG. 4 illustrates the operation of a peer server in establishing message flow according to one embodiment of the present invention. The peer server 18-1 is used as an example.

First, the peer server 18-1 obtains interest expressions for each virtual object in its virtual space VS1 (step 100). An interest expression for a virtual object includes information identifying message types produced by the virtual object and corresponding Areas of Interest (AOIs) and information identifying message types consumed by the virtual object and corresponding auras. The aura and AOI may vary depending on message type. If so, the interest expression includes information defining the AOI of the virtual object with respect to each message type consumed by the virtual object and the aura of the virtual object with respect to each message type produced by the virtual object. Note that rather than including information explicitly defining an AOI for a message type, an interest expression may include information from which the AOI for the message type may be extrapolated. For example, for visual messages from a virtual object such as a building, the interest expression may include information such as, for example, the size of the building. The AOI of the building with respect to the visual messages may then be extrapolated by the peer server 18-1 based on the size of the building or extrapolated by subsequent peer servers as messages related to the building are propagated. The ad/sub message may include information identifying the location of the building as well as the size of the building especially if, for example, the AOI is extrapolated by subsequent peer servers.

As used herein, aura is an area of the virtual world over which messages of a message type produced by a virtual object are relevant. For example, for messages of a visual type, a virtual object may have an aura corresponding to an area of the virtual world in which the virtual object can been seen. Likewise, for messages of an audio type, a virtual object may have an aura corresponding to an area of the virtual world in which sounds made by the virtual object can be heard. The aura of a message type may be expressed as, for example, a set of vectors each specifying a set of coordinates or a starting point, a direction, and a distance. The combination of the set of vectors using known geometric algorithms describes an area, which is the aura of the message type. As another example, in a virtual world that is a fractal generated maze, the aura may be expressed in terms of a starting point on the fractal and the limit to which the fractal equation should be applied from that point. Other ways to express the aura will be apparent to one of ordinary skill in the art upon reading this disclosure and are within the scope of the present invention. Further, the manner in which the aura is expressed may vary depending on the characteristics of the virtual world.

In contrast, an AOI is an area of the virtual world relevant to a virtual object from a consumer perspective. For example, for an avatar consuming messages of a visual type, the AOI of the avatar may correspond to an area of the virtual world that can be seen by the avatar. Thus, the AOI may correspond to the line-of-sight of the avatar. The AOI of a message type may be expressed as, for example, a set of vectors each specifying a set of coordinates or a starting point, a direction, and a distance. The combination of the set of vectors using known geometric algorithms describes an area, which is the AOI of the message type. As another example, in a virtual world that is a fractal generated maze, the AOI may be expressed in terms of a starting point on the fractal and the limit to which the fractal equation should be applied from that point. Other ways to express the AOI will be apparent to one of ordinary skill in the art upon reading this disclosure and are within the scope of the present invention. Further, the manner in which the AOI is expressed may vary depending on the characteristics of the virtual world.

A message type may be, for example, an event message type, a content message type, or a content update message type. The message types may be further classified by sub-type. Thus, in one embodiment, a message type includes a primary message type and a sub-type. The primary message type may be, for example, an event message type, a content message type, or a content update message type. The sub-types may further define the message types. For example, a sub-type may be an audio sub-type, a visual sub-type, an avatar movement sub-type, a social interaction sub-type, or a virtual space state sub-type. Thus, messages related to avatar movement may be classified as the event/avatar movement message type. Likewise, messages related to weather conditions in a virtual space may be classified as the event/virtual space state message type.

In addition, custom message types may be defined for a virtual object. The custom message types may be particularly beneficial where users are enabled to customize virtual objects and/or the virtual spaces hosted by their associated peer servers 18-1 through 18-N.

The interest expressions for the virtual objects may be actively obtained by the peer server 18-1, provided to the peer server 18-1 from some source such as the virtual objects, known by the peer server 18-1 in advance, or any combination thereof. For example, for an avatar, the interest expression for the avatar may be provided to the peer server 18-1 by the client associated with the avatar or provided to the peer server 18-1 by the avatar itself. Alternatively, if the avatar just entered the virtual space hosted by the peer server 18-1 from the virtual space hosted by, for example, the peer server 18-2, the peer server 18-2 may provide the interest expression for the avatar to the peer server 18-1. In the case of static virtual objects or virtual objects that do not leave the virtual space of the peer server 18-1, the interest expressions for these virtual objects may be known to the peer server 18-1. The above examples are not intended to limit the scope of the present invention. Other schemes for obtaining the interest expressions of the virtual objects within the virtual space hosted by the peer server 18-1 may be apparent to one of ordinary skill in the art upon reading this disclosure and are to be considered within the scope of the present invention.

While the process of obtaining the interest expressions of the virtual objects is illustrated as a single step, one of ordinary skill in the art will readily appreciate that the peer server 18-1 continually or periodically performs the process in order to accommodate changing interest expressions and mobile virtual objects entering and leaving the virtual space hosted by the peer server 18-1

The peer server 18-1 then generates an advertisement/subscription (ad/sub) message (step 102). The ad/sub message is also referred to herein as a message flow path setup message. While the ad/sub message is discussed herein as a single message, the peer server 18-1 may alternatively generate and issue separate advertisement and subscription messages. Further, while the ad/sub message discussed herein is an aggregate ad/sub message for each of the virtual objects in the virtual space hosted by the peer server 18-1, the present invention is not limited thereto. The peer server 18-1 may alternatively issue separate advertisement and subscription messages or ad/sub messages for each virtual object in the virtual space hosted by the peer server 18-1 or for groups of virtual objects within the virtual space hosted by the peer server 18-1.

In one embodiment, the ad/sub message includes an advertisement record for each message type produced by one or more of the virtual objects within the virtual space hosted by the peer server 18-1. Each advertisement record includes the corresponding message type and an aggregate scope corresponding to an aggregate or combination of the auras of the one or more virtual objects within the virtual space hosted by the peer server 18-1 that produce messages of the corresponding message type. The aggregate scope may be expressed as, for example, a set of vectors each specifying a set of coordinates or a starting point, a direction, and a distance. The combination of the set of vectors using known geometric algorithms describes an area, which is the aggregate scope of the advertisement record. As another example, in a virtual world that is a fractal generated maze, the aggregate scope may be expressed based on a fractal equation. As another example, the aggregate scope may be represented by conditional logic or expressions such as, for example, "within 500 ft from point A OR within 750 ft from point B." Note that rather than including the aggregate aura, the scope may alternatively include information from which the aggregate aura can be extrapolated. For example, for visual messages from a virtual object such as a building, the scope of the corresponding advertisement record may including information describing, for example, a size of the building. The scope or aura of the visual messages may be extrapolated based on the size of the building.

In one embodiment, when aggregating the auras of the one or more virtual objects within the virtual space hosted by the peer server 18-1 that produce messages of a particular message type, the peer server 18-1 may optionally adjust the aggregate scope to compensate for various factors such as, for example, movement of mobile virtual objects. For example, for a message type produced by an avatar, the peer server 18-1 may adjust the aura of the avatar when aggregating the aura with the auras of other virtual objects producing that message type or adjust the aggregate scope for the message type to include a margin that compensates for frequent movement of the avatar. More specifically, the peer server 18-1 may adjust the aura of the avatar or the aggregate scope for the message type such that the aggregate scope is expanded by some margin. For instance, the aura or aggregate scope may be expanded in all directions or expanded in a predicted direction of movement for the avatar.

In addition, each advertisement record may include information or metadata describing the one or more virtual objects producing the corresponding message type and/or one or more references to information or metadata describing the virtual objects producing the corresponding message types. In addition to describing the virtual objects themselves, the metadata may also include or describe the states of the virtual objects such as, for example, the locations of the virtual objects producing the corresponding message type.

The ad/sub message also includes a subscription record for each message type consumed by one or more of the virtual objects within the virtual space hosted by the peer server 18-1. Each subscription record includes the corresponding message type and an aggregate scope corresponding to an aggregate or combination of the AOIs of the one or more virtual objects within the virtual space hosted by the peer server 18-1 that consume messages of the corresponding message type. The aggregate scope may be expressed as, for example, a set of vectors each specifying a set of coordinates or a starting point, a direction, and a distance. The combination of the set of vectors using known geometric algorithms describes an area, which is the aggregate scope of the subscription record. As another example, in a virtual world that is a fractal generated maze, the aggregate scope may be expressed based on a fractal equation. As another example, the aggregate scope may be represented using a conditional expression.

In one embodiment, when aggregating the AOIs of the one or more virtual objects within the virtual space hosted by the peer server 18-1 that consume messages of a particular message type, the peer server 18-1 may optionally adjust the aggregate scope to compensate for various factors such as, for example, the movement of mobile virtual objects. For example, for a message type produced by an avatar, the peer server 18-1 may adjust the AOI of the avatar when aggregating the AOI with the AOIs of other virtual objects consuming that message type or adjust the aggregate scope for the message type to compensate for frequent movement of the avatar. More specifically, the peer server 18-1 may adjust the AOI of the avatar or the aggregate scope for the message type such that the aggregate scope is expanded.

In addition, each subscription record may include additional criteria for identifying virtual objects producing the corresponding message types that are of interest to the peer server 18-1 and/or the virtual objects within the virtual space hosted by the peer server 18-1 having an interest in the corresponding message type. For example, with respect to avatars producing messages of the corresponding message type, the criteria may include demographic or biological information describing the associated users or the like. Other criteria will be apparent to one of ordinary skill in the art upon reading this disclosure. Note that the criteria may vary depending on the details of the virtual world.

Note that the ad/sub message may also include an advertisement record for a new virtual object. The advertisement record may then trigger the other peer servers having an interest in the new virtual object to obtain content or other information and possibly an application needed to render the new virtual object from the peer server 18-1 or some other source. This may be particularly beneficial where users are enabled to customize their own virtual spaces. The ad/sub message may also include advertisement records for messages produced by the new virtual object and subscription records for messages consumed by the new virtual object.

While the discussion herein focuses on the embodiment where each of the advertisement and subscription records includes a scope, the present invention is not limited thereto. As an alternative, the ad/sub message may include a global scope applicable to all of the advertisement and subscription records. As another alternative, the ad/sub message may include a scope applicable to all of the advertisement records and a scope applicable to all of the subscription records.

When generating the ad/sub message, the peer server 18-1 may use conditional logic or expressions to represent or combine multiple records into a single rule. For example, rather than having a separate advertisement record for each message type produced, the peer server 18-1 may combine all advertisement records into a single conditional expression, or rule, or combine subsets of the records into corresponding conditional expressions, or rules.

Note that while the following discussion focuses on generating an ad/sub message including advertisement and subscription records for each virtual object within the virtual space hosted by the peer server 18-1, the present invention is not limited thereto. For example, the first ad/sub message generated and issued by the peer server 18-1 may be a complete ad/sub message including an advertisement record for each message type produced by any virtual object within the virtual space hosted by the peer server 18-1 and a subscription record for each message type consumed by any virtual object within the virtual space hosted by the peer server 18-1. However, subsequent ad/sub messages generated and issued by the peer server 18-1 may be complete ad/sub messages or, alternatively, may be partial ad/sub messages reflecting changes since the previous ad/sub message was generated and issued by the peer server 18-1.

In addition to the advertisement and subscription records, the ad/sub message may include unsubscribe messages enabling the peer server 18-1 to unsubscribe to message types that were previously of interest to the peer server 18-1. For example, the peer server 18-1 may desire to unsubscribe to a message type if the peer server 18-1 no longer has an interest in the message type.

Once the ad/sub message is generated, the peer server 18-1 sends the ad/sub message to one or more of its neighboring peer servers 18-2 through 18-7 (step 104). In one embodiment, the peer server 18-3 propagates the ad/sub message in an expanding ring search (ERS) manner, where a time-to-live (TTL) may be defined in order to enforce an absolute upper limit on the propagation of the ad/sub message.

More specifically, in one embodiment, the peer server 18-1 sends the ad/sub message to all of its neighboring peer servers 18-2 through 18-7.

In another embodiment, the peer server 18-1 generates copies of the ad/sub message for each of the neighboring peer servers 18-2 through 18-7 and filters the copies of the ad/sub message based on the scopes of the advertisement and subscription messages. More specifically, for the neighboring peer server 18-2, advertisement records that have scopes that do not extend into the virtual space of the neighboring peer server 18-2 are filtered from the copy of the ad/sub message to be provided to the neighboring peer server 18-2. Note that the records that have already been processed with respect to the neighboring peer server 18-2 may also be filtered. Likewise, subscription messages whose scopes do not extend into the virtual space of the neighboring peer server 18-2 are filtered from the copy of the ad/sub message to be provided to the neighboring peer server 18-2. If the filtered copy of the ad/sub message to be provided to the neighboring peer server 18-2 is empty, then no ad/sub message is provided to the neighboring peer server 18-2. Otherwise, the filtered copy of the ad/sub message is provided to the neighboring peer server 18-2. Likewise, the copies of the ad/sub message for the other neighboring peer servers 18-3 through 18-7 are filtered and provided to the other neighboring peer servers 18-3 through 18-7.

As discussed below, the neighboring peer servers 18-2 through 18-7 then process the ad/sub message, propagate the ad/sub message if appropriate, and respond to the ad/sub message. Thus, the peer server 18-1 receives responses to the ad/sub message from one or more of the neighboring peer servers 18-2 through 18-7 (step 106). The responses from the neighboring peer servers 18-2 through 18-7 identify message types of interest or, more specifically, identify message types from the advertisement records in the ad/sub message that are to be routed to them. Using the peer server 18-2 as an example, the response from the peer server 18-2 identifies message types from the advertisement records in the ad/sub message that are of interest to the peer server 18-2. The message types are of interest to the peer server 18-2 if they are consumed by virtual objects in the virtual space hosted by the peer server 18-2 or of interest to one or more neighboring peer servers of the peer server 18-2 to which the peer server 18-2 propagated the ad/sub message. If none of the message types from the advertisement records in the ad/sub message are of interest to the peer server 18-2, the peer server 18-2 may provide a response indicating that none of the message types from the advertisement records are of interest or, alternatively, may not respond to the ad/sub message. Likewise, the other neighboring peers 18-3 through 18-7 provide responses to the ad/sub message.

Based on the responses to the ad/sub message from the neighboring peer servers 18-2 through 18-7, the peer server 18-1 then updates its routing table such that messages produced by the virtual objects in the virtual space hosted by the peer server 18-1 are routed only to the ones of the neighboring peer servers 18-2 through 18-7 expressing an interest in that message type (step 108). In one embodiment, for each message type from the advertisement records in the ad/sub message, the routing table includes an entry in the form of:

<message type><message recipient(s)><virtual object ID(s)> where the virtual object IDs are IDs of the virtual objects in the virtual space hosted by the peer server 18-1 that are producers of the message type. Alternatively, the routing table may be maintained such that any message originating in the virtual space hosted by the peer server 18-1 of the corresponding message type is to be routed according to this entry. The message recipients are one or more of the neighboring peer servers 18-2 through 18-7 that have expressed an interest in the message type. Thereafter, when a virtual object produces a message, the peer server 18-1 routes the message according to the routing table such that the message is routed only to ones of the neighboring peer servers 18-2 through 18-7 that have expressed an interest in that message type.

As discussed below in detail, with respect to the subscription records in the ad/sub message, message flow paths from others of the peer servers 18-2 through 18-N hosting virtual objects producing message types identified in the subscription records are identified as the ad/sub message is propagated among the peer servers 18-2 through 18-N.

Figure 5:
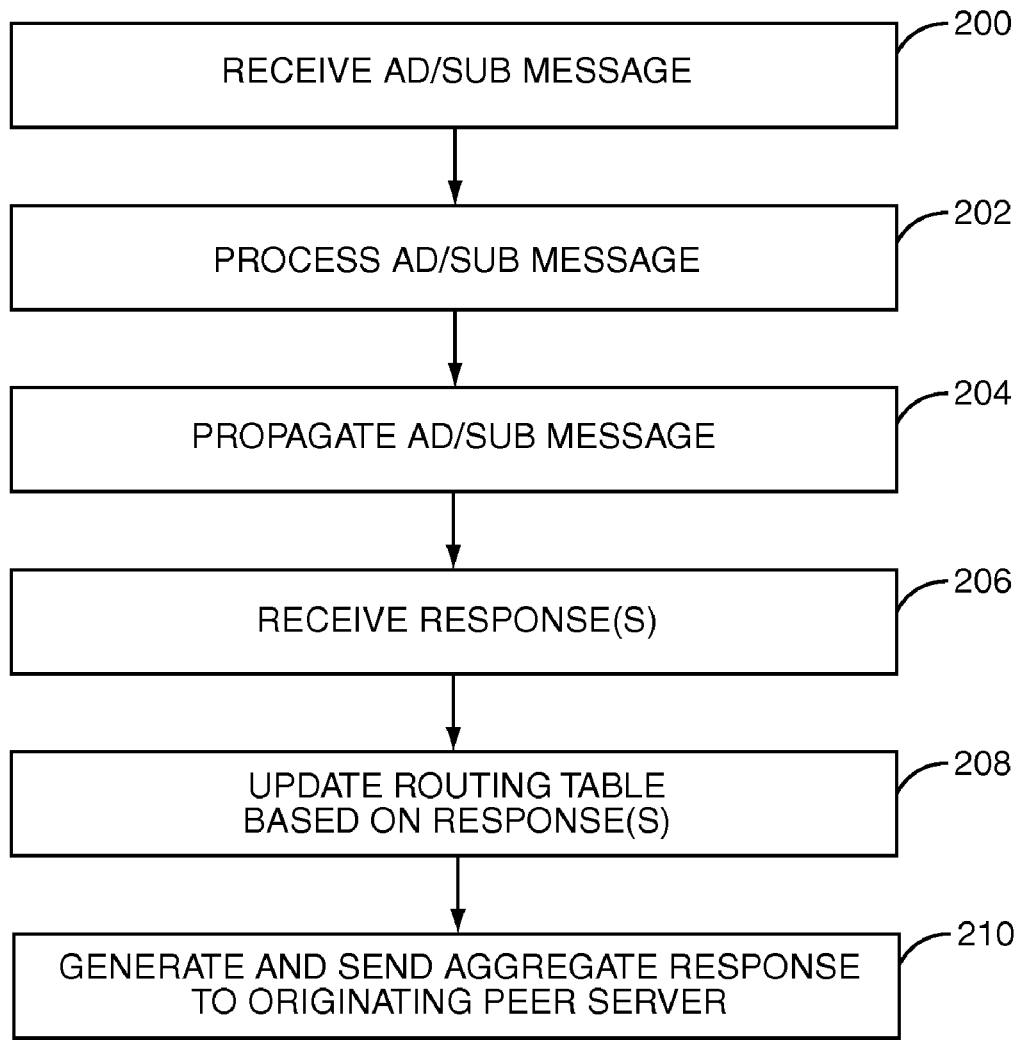
FIG. 5 illustrates the operation of a neighboring peer server in response to receiving the ad/sub message from an originating peer server according to one embodiment of the present invention.

FIG. 5 illustrates the operation of a peer server, such as the peer server 18-3, receiving the ad/sub message from the peer server 18-1 according to one embodiment of the present invention. The peer server 18-1 is also referred to herein as the originating peer server 18-1. First, the peer server 18-3 receives the ad/sub message from the originating peer server 18-1 (step 200). The peer server 18-3 then processes the ad/sub message to determine whether to subscribe to any of the message types identified by the advertisement records in the ad/sub message and, based on the subscription records, whether any message types produced by virtual objects in the virtual space hosted by the peer server 18-3 are to be routed to the originating peer server 18-1 (step 202).

More specifically, for each advertisement record, the peer server 18-3 determines whether any of the virtual objects in the virtual space hosted by the peer server 18-3 are consumers of the corresponding message type. If so, the peer server 18-3 determines whether any of the virtual objects that are consumers of the message type are within the aggregate scope, or aggregate aura, for the advertisement record or, alternatively, whether any portion of the virtual space hosted by the peer server 18-3 is within the aggregate scope, or aggregate aura, for the advertisement record. If so, the peer server 18-3 adds an entry to a response to the ad/sub message to be thereafter provided to the originating peer server 18-1 subscribing to messages of the message type from the originating peer server 18-1. As a result, the response to the ad/sub message includes entries subscribing to each of the message types identified by the advertisement records of the ad/sub message that are consumed by one or more of the virtual objects in the virtual space hosted by the peer server 18-3.

In addition, for each subscription record, the peer server 18-3 determines whether messages of the corresponding message type are produced by one or more virtual objects within the virtual space hosted by the peer server 18-3. If so, the peer server 18-3 determines whether any of the virtual objects producing the corresponding message type are within the aggregate scope, or aggregate AOI, for the subscription record or, alternatively, if any portion of the virtual space hosted by the peer server 18-3 is within the aggregate scope, or aggregate AOI, for the subscription record. If so, the peer server 18-3 updates its routing table such that messages of the corresponding message type produced by virtual objects within the aggregate scope for the subscription record are routed to the originating peer server 18-1.

In addition, the peer server 18-3 propagates the ad/sub message, or a filtered copy thereof, to one or more of its neighboring peer servers 18-2, 18-4, and 18-8 through 18-10 (step 204). In one embodiment, there is a pre-established default routing scheme for the ad/sub message. Assuming an efficient routing scheme, the peer server 18-3 may propagate the ad/sub message, or a filtered copy thereof, only to the ones of its neighboring peer servers 18-2, 18-4, and 18-8 through 18-10 that have not or will not receive the ad/sub message from another peer server according to the default routing scheme. However, the present invention is not limited thereto. Any routing scheme may be used. Further, the propagation does not have to be efficient. In other words, duplicate ad/sub messages may be permitted and simply ignored. Also note that the ad/sub message may be used to establish the default routing scheme, or propagation path, for subsequent ad/sub messages. Note that while peer servers 18-2 and 18-4 are also neighbors of the peer server 18-3, the ad/sub message need not be propagated to them because they are also neighbors of the originating peer server 18-1 and have therefore already received the ad/sub message from the originating peer server 18-1.

More specifically, in one embodiment, the peer server 18-3 creates a copy of the ad/sub message for each of the neighboring peer servers 18-8 through 18-10 and optionally filters the copies of the ad/sub messages based on the scopes of the advertisement and subscription records. Using the peer server 18-8 as an example, the peer server 18-3 may filter the copy of the ad/sub message for the peer server 18-8 to remove advertisement and subscription records whose aggregate scopes do not extend into the virtual space hosted by the peer server 18-8. Likewise, the copies of the ad/sub message for the other neighboring peer servers 18-9 and 18-10 are filtered. The filtered copies of the ad/sub message are then provided to neighboring peer servers 18-8 through 18-10.

With respect to the subscription records, when propagating the copies of the ad/sub message to the neighboring peer servers 18-8 through 18-10, the peer server 18-3 updates its routing table such that messages from its neighboring peer servers of the message types identified by the subscription records are routed to the originating peer server 18-1. More specifically, using the peer server 18-8 as an example, the peer server 18-3 updates its routing table such that messages of the message types identified in the subscription records in the copy of the ad/sub message provided to the peer server 18-8 that are thereafter received from the peer server 18-8 are routed to the originating peer server 18-1. As discussed below, the neighboring peer server 18-8 updates its routing table in response to the ad/sub message such that messages originating from virtual objects in its virtual space or received from its neighboring peer servers that are of the message types identified in the subscription records are routed to the peer server 18-3, which in turn routes the messages to the originating peer server 18-1.

The peer server 18-3 then receives responses to the ad/sub message from the neighboring peer servers 18-8 through 18-10 (step 206). The responses identify ones of the message types from the advertisement records of the ad/sub message, or filtered copy thereof, that are of interest to the neighboring peer servers 18-8 through 18-10. Message types are of interest to the neighboring peer servers 18-8 through 18-10 if the neighboring peer servers 18-8 through 18-10 host virtual objects within their virtual spaces that consume the message types or if the neighboring peer servers of the peer servers 18-8 though 18-10 express an interest in the message types in response to propagation of the ad/sub message from the peer servers 18-8 through 18-10 to those neighboring peer servers. Using the peer server 18-8 as an example, the response from the peer server 18-8 includes a number of entries, records, or information otherwise identifying message types from advertisement records of the copy of the ad/sub message provided to the peer server 18-8 that are of interest to the peer server 18-8.

After receiving the responses, the peer server 18-3 updates its routing table such that messages from the originating peer server 18-1 are routed to ones of the neighboring peer servers 18-8 through 18-10 that have expressed an interest in those message types (step 208). In one embodiment, the peer server 18-3 generates an entry in its routing table for each message type from the originating peer server 18-1 in the form of:

<preceding peer server><message type><message origin><succeeding peer(s)> where, in this example, the preceding peer is the originating peer server 18-1 and the one or more succeeding peers are the ones of the neighboring peer servers 18-8 through 18-10 that have expressed an interest in that message type in response to the ad/sub message. The message origin may be information identifying one or more originating peer servers, which in some scenarios may be different than the preceding peer server, to which this routing table entry applies. Note that the entries in the routing table may include additional information.

In addition, the peer server 18-3 generates and sends an aggregate response to the originating peer server 18-1 (step 210). The aggregate response is the aggregate or combination of the responses from the neighboring peer servers 18-8 through 18-10 and the response of the peer server 18-3 generated in step 202. As such, the aggregate response identifies the message types from the advertisement records in the ad/sub message received from the originating peer server 18-1 in which the peer server 18-3 has an interest. Again, the peer server 18-3 has an expressed interest in message types consumed by virtual objects in the virtual space hosted by the peer server 18-3 as well as message types of interest to the neighboring peer servers 18-8 through 18-10. As discussed above, upon receiving the aggregate response to the ad/sub message, the originating peer server 18-1 updates its routing table such that messages of the message types in which the peer server 18-3 has expressed an interest are routed to the peer server 18-3.

In a similar fashion, the other neighboring peer servers 18-2 and 18-4 through 18-7 of the originating peer server 18-1 process, propagate, and respond to the ad/sub message from the originating peer server 18-1. As a result, message flow paths for the message types produced by the virtual objects in the virtual space hosted by the originating peer server 18-1 are defined. In addition, as a result of the subscription records in the ad/sub message, message flow paths for message types produced by virtual objects in the virtual spaces hosted by the other peer servers 18-2 through 18-N that are of interest to one or more of the virtual objects in the virtual space hosted by the originating peer server 18-1 are defined from the corresponding ones of the peer servers 18-2 through 18-N to the originating peer server 18-1. Likewise, the other peer servers 18-2 through 18-N issue their own ad/sub messages in order to define message flow paths for message types produced and consumed by the virtual objects within their virtual spaces.

Figure 6A:
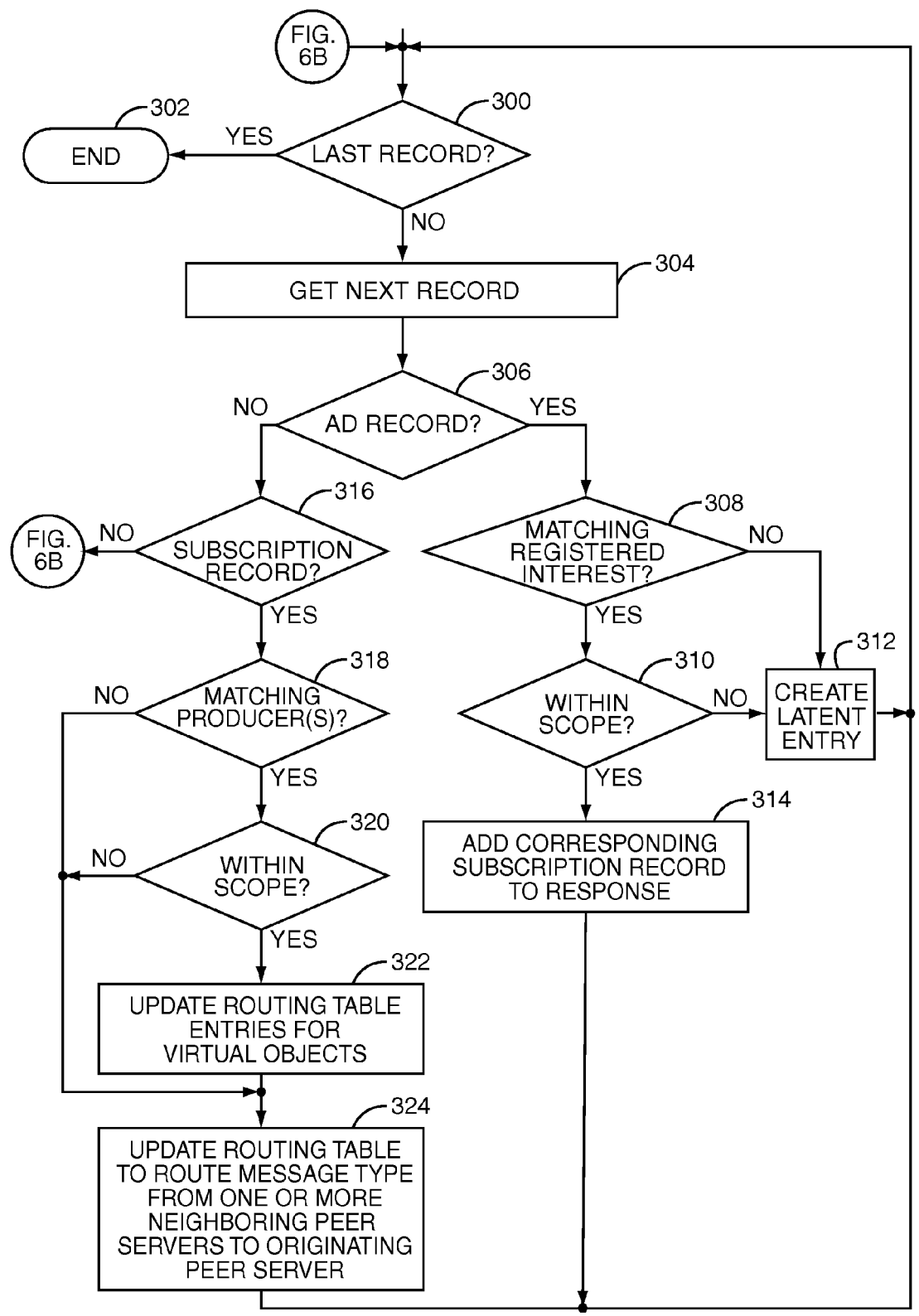
FIGS. 6A and 6B are a more detailed illustration of the operation of the neighboring peer server to process the ad/sub message according to one embodiment of the present invention.
Figure 6B:
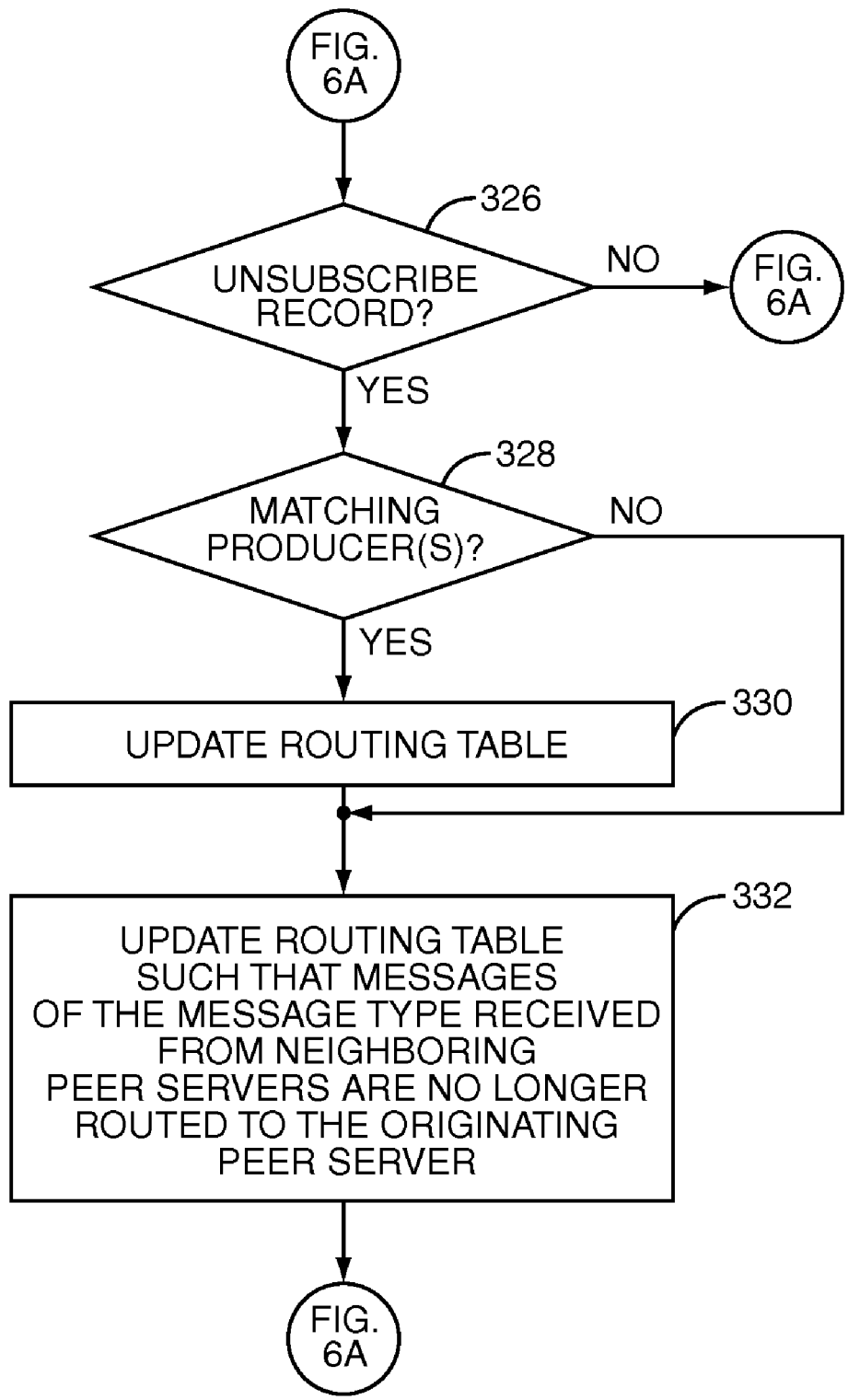

FIGS. 6A and 6B are a more detailed illustration of the processing step 202 of FIG. 5 according to one embodiment of the present invention. More specifically, in order to process the ad/sub message from the originating peer server 18-1, the peer server 18-3 first determines whether it has reached the last record in the ad/sub message (step 300). Note that step 300 is preferably not performed the first iteration through the processing loop since the ad/sub message includes at least one record. If the peer server 18-3 has reached the last record in the ad/sub message, the process ends (step 302). If the last record in the ad/sub message has not been reached, the peer server 18-3 then gets the next record, which for the first iteration will be the first record, in the ad/sub message (step 304).

The peer server 18-3 then determines whether the record is an advertisement record (step 306). If so, the peer server 18-3 determines whether any of the virtual objects in the virtual space hosted by the peer server 18-3 have registered an interest for the message type identified by the advertisement record (step 308). More specifically, in one embodiment, the peer server 18-3 may determine whether any of the virtual objects in its virtual space are consumers of the message type based on the interest expressions of the virtual objects that have been registered with the peer server 18-3. If one or more of the virtual objects in the virtual space hosted by the peer server 18-3 is a consumer of the message type, the peer server 18-3 then determines whether the virtual objects that are consumers of the message type are within the aggregate scope or, optionally, expected to be within the aggregate scope for the advertisement record (step 310).

If none of the virtual objects in the virtual space hosted by the peer server 18-3 have an interest in the message type or if none of the virtual objects in the virtual space having an interest in the message type are within or expected to be within the aggregate scope for the advertisement record, the peer server 18-3 may optionally create a latent entry or latent advertisement record (step 312). The latent entry generally corresponds to the advertisement record and is stored such that the peer server 18-3 may subscribe to the message type of the advertisement record in the future if one or more virtual objects in its virtual space have a registered interest in the message type and are within or expected to be within the aggregate scope of the advertisement record. If one or more of the virtual objects in the virtual space have a registered interest in the message type and are within or expected to be within the aggregate scope of the advertisement record, the peer server 18-3 adds a corresponding subscription record to the response to the ad/sub message to be provided to the originating peer server 18-1 (step 314).

Returning to step 306, if the record is not an advertisement record, the peer server 18-3 determines whether the record is a subscription record (step 316). If so, the peer server 18-3 determines whether any of the virtual objects in the virtual space hosted by the peer server 18-3 are producers of the corresponding message type (step 318). If so, the peer server 18-3 determines whether any of the virtual objects that produce the message type are within the aggregate scope, or aggregate AOI, of the subscription record (step 320). If so, the peer server 18-3 updates its routing table such that messages of the message type produced by the virtual objects in its virtual space and within the aggregate scope of the subscription record are routed to the originating peer server 18-1 (step 322).

Then, whether or not any of the virtual objects in the virtual space of the peer server 18-3 are interested in the message type and, if so, are within the aggregate scope of the subscription record, the process proceeds to step 324. In step 324, the peer server 18-3 updates its routing table such that messages of the message type identified by the subscription record received from one or more of its neighboring peer servers 18-8 through 18-10 to which the peer server 18-3 propagates the ad/sub message are thereafter routed to the originating peer server 18-1 (step 324). Thus, whether or not any virtual objects in the virtual space hosted by the peer server 18-3 are consumers of the message type, the peer server 18-3 still updates its routing table if it propagates the ad/sub message to one or more of its neighboring peer servers 18-8 through 18-10 such that messages received from those neighboring peer servers of that message type are routed to the originating peer server 18-1. At this point, the process returns to step 300 and is repeated for the next record in the ad/sub message.

Returning to step 316, if the record is not a subscription record, the peer server 18-3 determines whether the record is an unsubscribe record (FIG. 6B, step 326). In general, an unsubscribe record may be issued by the originating peer server 18-1 when the originating peer server 18-1 no longer has an interest in the corresponding message type. For example, the originating peer server 18-1 may issue an unsubscribe record when an avatar that is a consumer of a message type leaves the virtual space of the originating peer server 18-1 and the originating peer server 18-1 has no other virtual objects consuming the message type and the originating peer server 18-1 does not have an interest in the message type for purposes of routing. If the record is not an unsubscribe record, the process returns to step 300. If the record is an unsubscribe record, the peer server 18-3 determines whether any of the virtual objects in its virtual space are producers of the corresponding message type (step 328). If so, the peer server 18-3 updates its routing table such that messages of the corresponding message type produced by virtual objects within its virtual space are no longer routed to the originating peer server 18-1 (step 330). In addition, whether or not virtual objects producing the corresponding message type are within the virtual space of the peer server 18-3, the peer server 18-3 updates its routing table such that messages of the corresponding message type received from its neighboring peer servers 18-8 through 18-10 are no longer routed to the originating peer server 18-1 (step 332). The process then returns to step 300 of FIG. 6A and is repeated for the next record in the ad/sub message.

Figure 7:
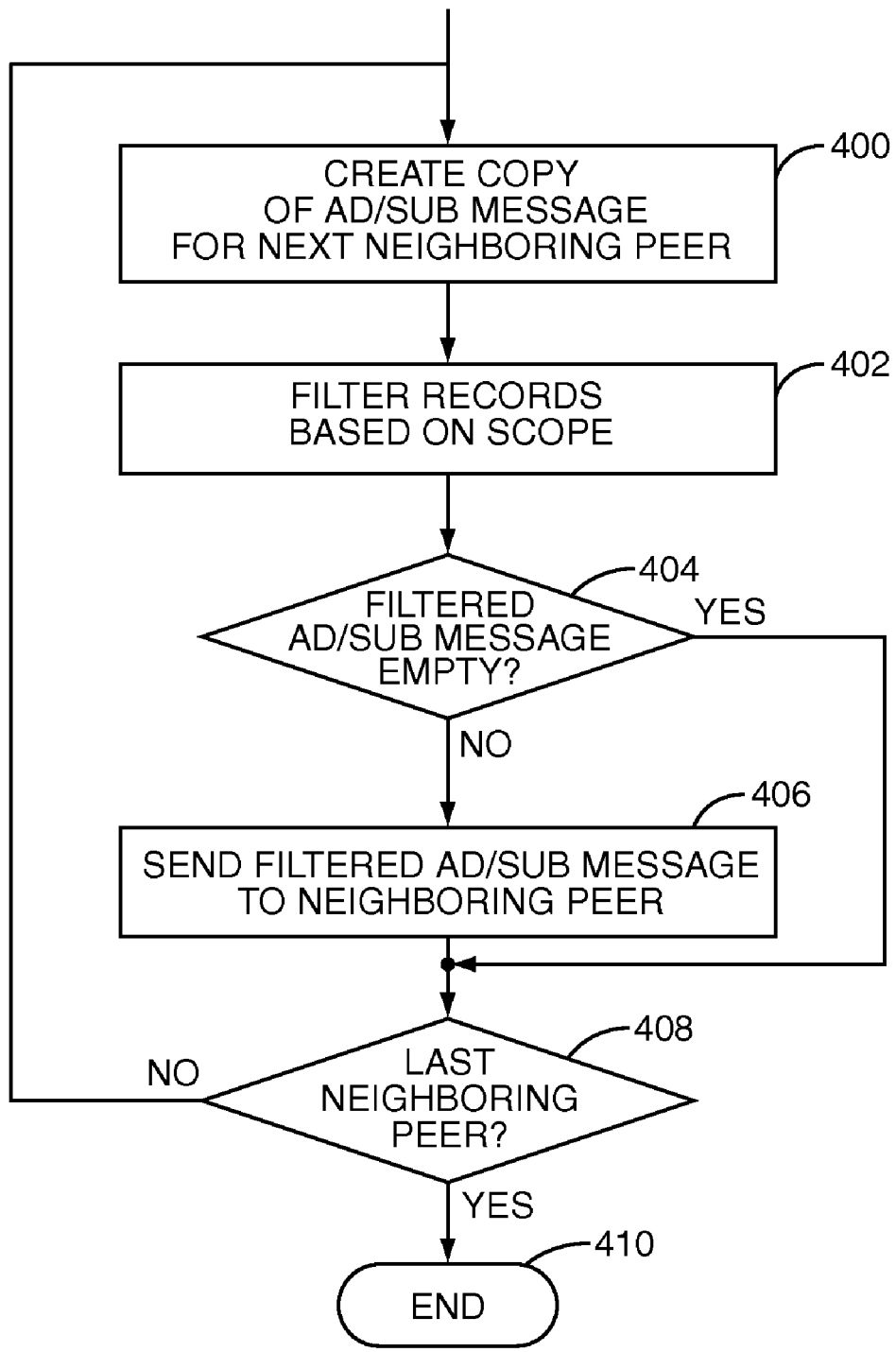
FIG. 7 is a more detailed illustration of the operation of the neighboring peer server to propagate the ad/sub message according to one embodiment of the present invention.

FIG. 7 is a more detailed illustration of the propagation step 204 of FIG. 5 according to one embodiment of the present invention. First, the peer server 18-3 generates a copy of the ad/sub message from the originating peer server 18-1 for one of its neighboring peer servers 18-8 through 18-10 (step 400). Note that it may not be necessary to create a copy of the ad/sub message if no modifications are necessary before propagation. In this example, the originating peer server 18-3 first generates a copy of the ad/sub message for the peer server 18-8. Copies of the ad/sub message for the other neighboring peer servers 18-9 and 18-10 are generated and processed in subsequent iterations of the loop.

The peer server 18-3 then filters the advertisement and subscription records in the copy of the ad/sub message based on the aggregate scope of each of the records (step 402). More specifically, advertisement records having an aggregate scope, or aggregate aura, that does not extend into the virtual space hosted by the peer server 18-8 are removed from the copy of the ad/sub message to be provided to the peer server 18-8. Likewise, subscription records having an aggregate scope, or aggregate AOI, that does not extend into the virtual space hosted by the peer server 18-8 are also removed from the copy of the ad/sub message to be provided to the peer server 18-8.

After filtering, the peer server 18-3 determines whether the filtered copy of the ad/sub message is empty (step 404). If not, the peer server 18-3 sends the filtered copy of the ad/sub message to the peer server 18-8 (step 406). Note that, at this point, the peer server 18-3 may update its routing table such that messages of the message types identified by the subscription records in the filtered copy of the ad/sub message that are thereafter received from the peer server 18-8 are routed to the originating peer server 18-1. Then, whether or not the filtered copy of the ad/sub message is empty, the peer server 18-3 determines whether the peer server 18-8 is the last neighboring peer server (step 408). If so, the process ends (step 410). If not, the process returns to step 400 and is repeated for the remaining neighboring peer servers 18-9 and 18-10.

FIGS. 8A through 8D illustrate the advertisement and subscription process according to one embodiment of the present invention. For clarity and ease of discussion, FIGS. 8A through 8D illustrate the process with respect to the cells, or virtual spaces, of the virtual world. However, as will be appreciated by one of ordinary skill in the art, the actual message flow is between the peer servers 18-1 through 18-18 and the clients 20-X, 20-Y, and 20-Z associated with the illustrated avatars.

Figure 8A:
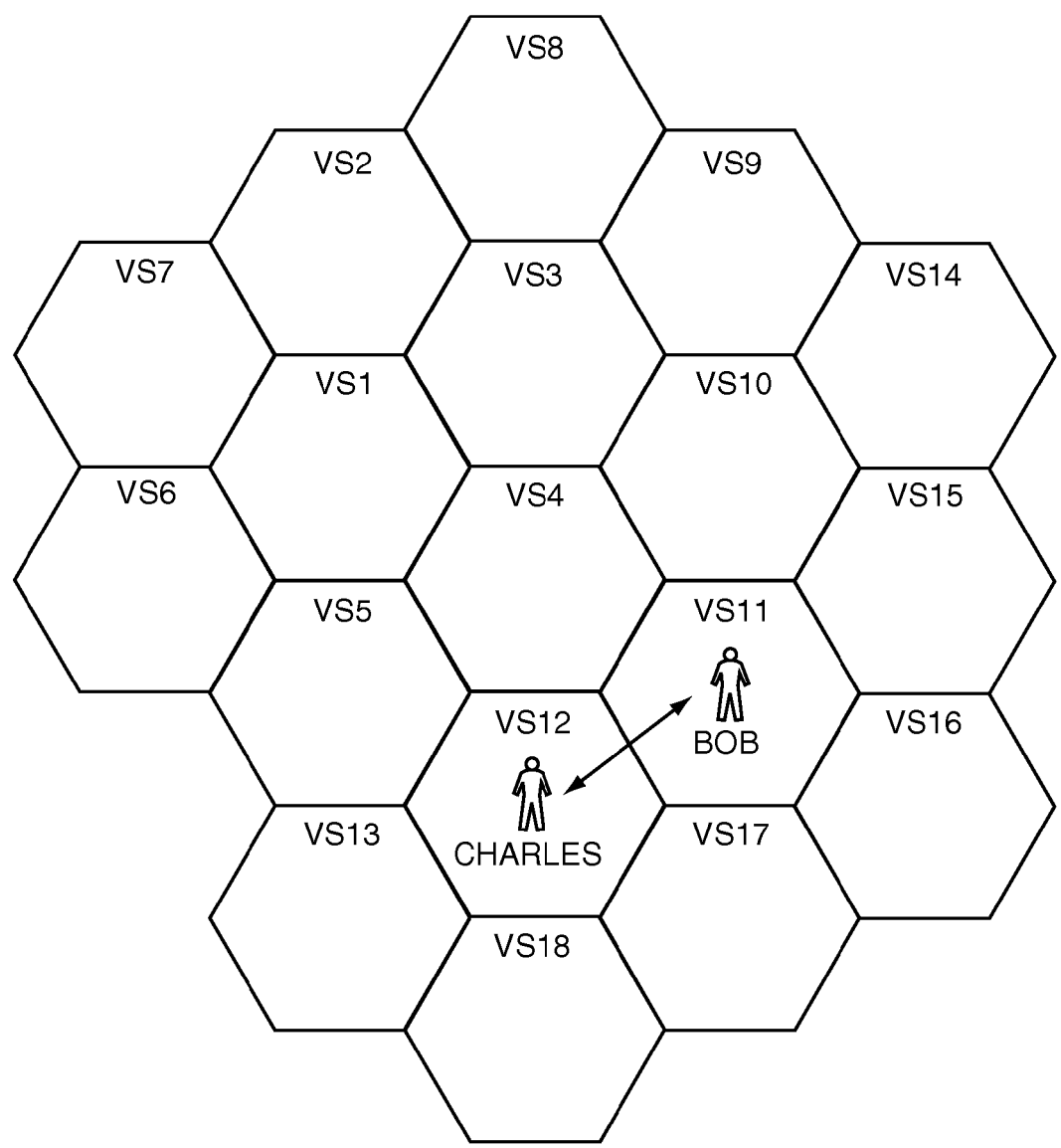

FIG. 8A illustrates an initial state where an avatar of a user Bob is within virtual space VS11, which is hosted by peer server 18-11 (FIG. 3). Likewise, an avatar of a user Charles is within virtual space VS12, which is hosted by peer server 18-12 (FIG. 3). The peer servers 18-11 and 18-12 have already established the message flow path for messages consumed and produced by the avatars of Bob and Charles.

Figure 8B:
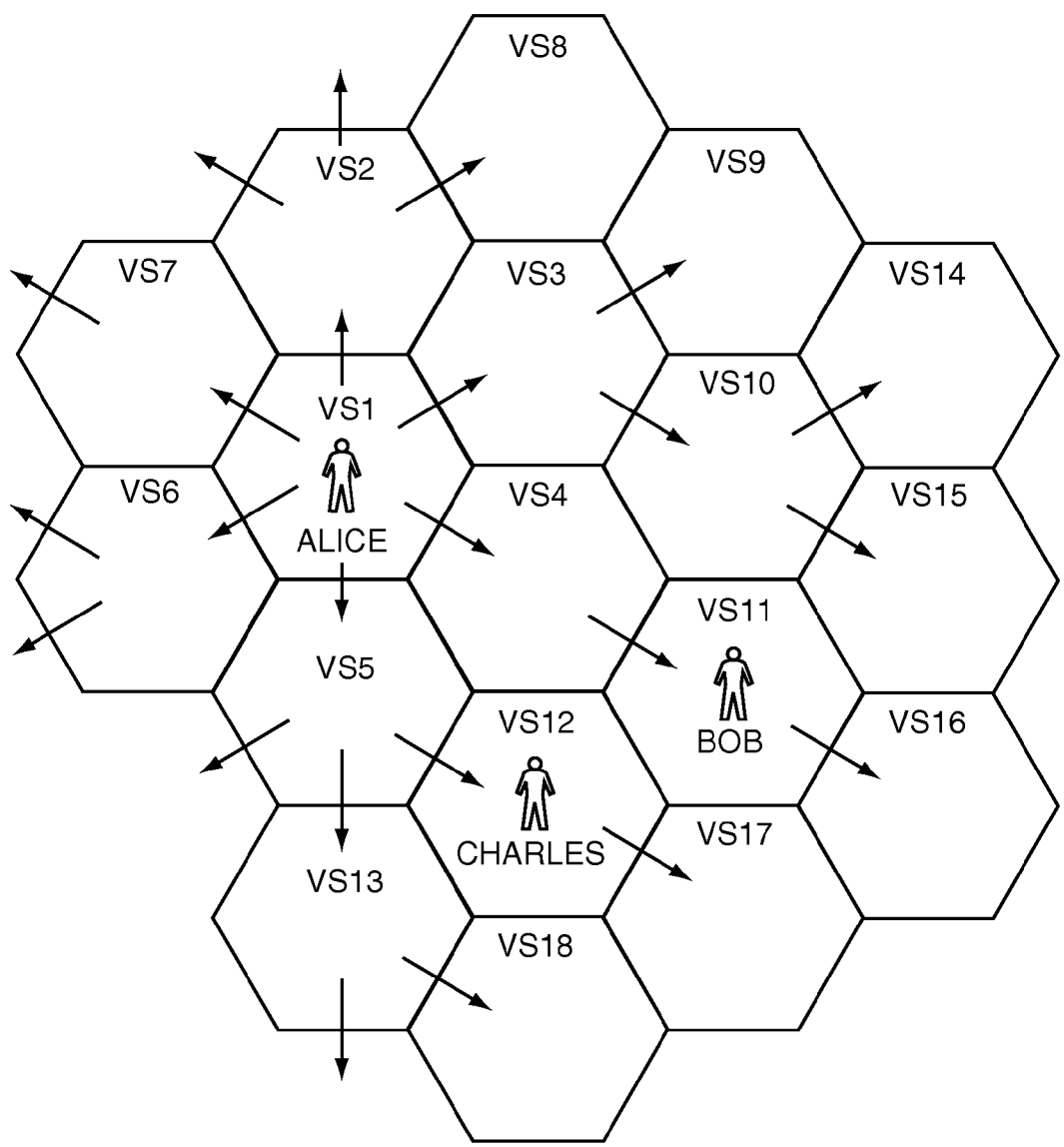

FIG. 8B illustrates the virtual world at a subsequent point in time where an avatar of a user Alice is within virtual space VS1, which is hosted by the peer server 18-1 (FIG. 3). As a result, the peer server 18-1 hosting the virtual space VS1, which is hereafter referred to as the originating peer server 18-1, issues an ad/sub message to its neighboring peer servers 18-2 through 18-7 in the manner discussed above. The ad/sub message includes an advertisement record for each message type produced by the avatar of Alice and a subscription record for each message type consumed by the avatar of Alice. The ad/sub message is then propagated among the peer servers 18-2 through 18-N based on the aggregate scope of each of the advertisement and subscription records in the ad/sub message.

As illustrated, the ad/sub message is propagated to the peer server 18-4 hosting the virtual space VS4, which in turn propagates the ad/sub message, or a filtered copy thereof, to the peer server 18-11 hosting the virtual space VS11. Similarly, the ad/sub message is propagated to the peer server 18-5 hosting the virtual space VS5, which in turn propagates the ad/sub message, or a filtered copy thereof, to the peer server 18-12 hosting the virtual space VS12.

Figure 8C:
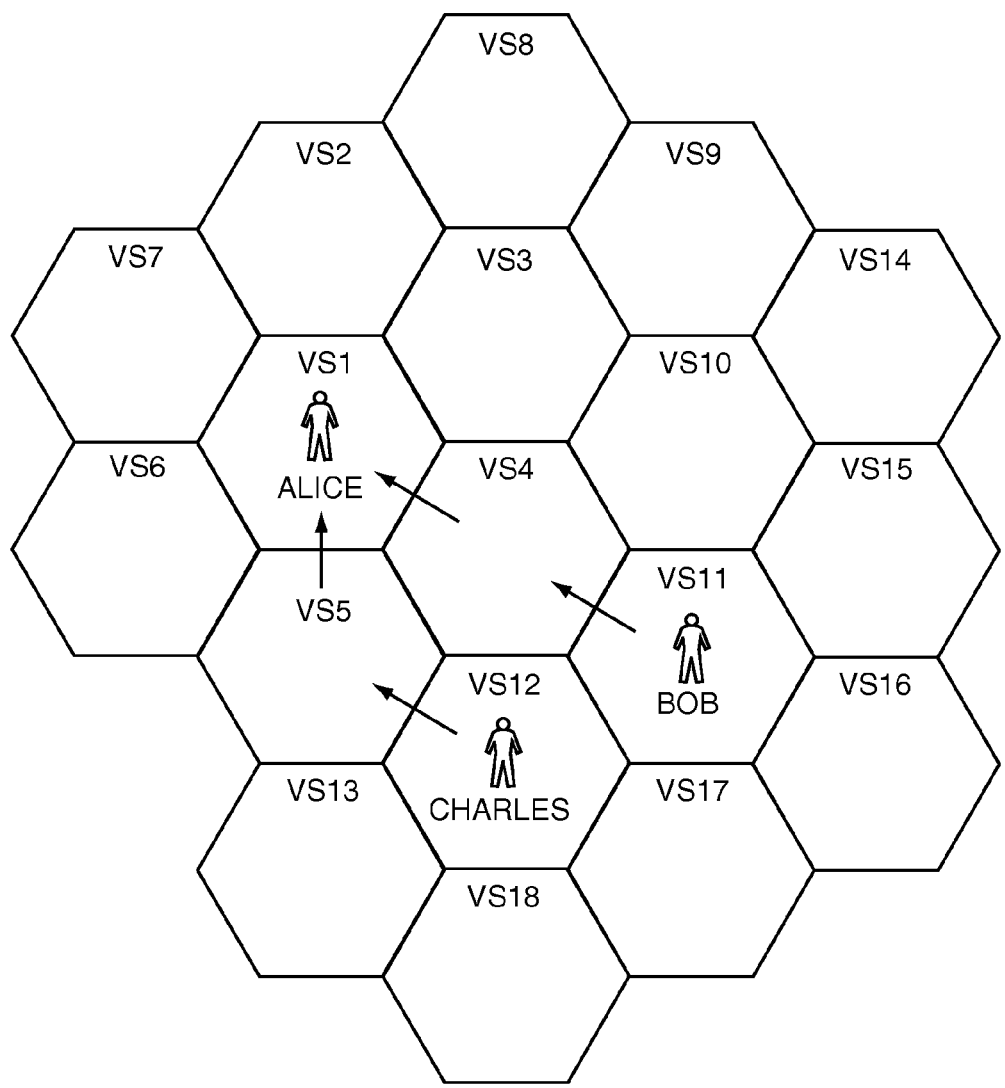

FIG. 8C illustrates the responses to the ad/sub message according to one embodiment of the present invention. In this example, ones of the peer servers 18-2 through 18-N in receipt of the ad/sub message and not having an interest in one or more of the message types identified by the advertisement records do not respond. However, the present invention is not limited thereto. As illustrated, because the avatar of the user Bob is a consumer of all or at least some of the message types produced by the avatar of the user Alice identified in the advertisement records in the ad/sub message, the peer server 18-11 hosting the virtual space VS11 sends a response to the peer server 18-4 hosting the virtual space VS4 expressing an interest in one or more of the message types identified by the advertisement records that are consumed by the avatar of the user Bob. As a result, the peer server 18-4 hosting the virtual space VS4 updates its routing table and sends a response to the peer server 18-1 expressing an interest in the message types identified in the response from the peer server 18-11. In response, the originating peer server 18-1 updates its routing table such that messages of the message types in which the peer server 18-4 has expressed an interest are thereafter routed to the peer server 18-4, which in turn routes those messages to the peer server 18-11.

Likewise, because the avatar of the user Charles is a consumer of all or at least some of the message types produced by the avatar of the user Alice identified in the advertisement records in the ad/sub message, the peer server 18-12 hosting the virtual space VS12 sends a response to the peer server 18-5 hosting the virtual space VS5 expressing an interest in one or more of the message types identified by the advertisement records that are consumed by the avatar of the user Charles. As a result, the peer server 18-5 hosting the virtual space VS5 updates its routing table and sends a response expressing an interest in the message types identified in the response from the peer server 18-12. In response, the originating peer server 18-1 updates its routing table such that messages of message types in which the peer server 18-5 has expressed an interest are thereafter routed to the peer server 18-5, which in turn routes those messages to the peer server 18-12.

With respect to the message types consumed by the avatar of the user Alice, the peer server 18-4 hosting the virtual space VS4 updates its routing table in response to the ad/sub message such that messages of the message types identified by the subscription records in the ad/sub message subsequently received from its neighboring peer servers such as the peer server 18-11 are routed to the originating peer server 18-1. The peer server 18-11 updates its routing table in response to the ad/sub message such that messages produced by the avatar of the user Bob of the message types identified by the subscription records are routed to the peer server 18-4 hosting the virtual space VS4, which will then route those messages to the peer server 18-1. In a similar fashion, the peer servers 18-5 and 18-12 establish a message flow path for the message types produced by the avatar of the user Charles that are consumed by the avatar of the user Alice from the peer server 18-12 to the peer server 18-1 via the peer server 18-5.

Figure 8D:
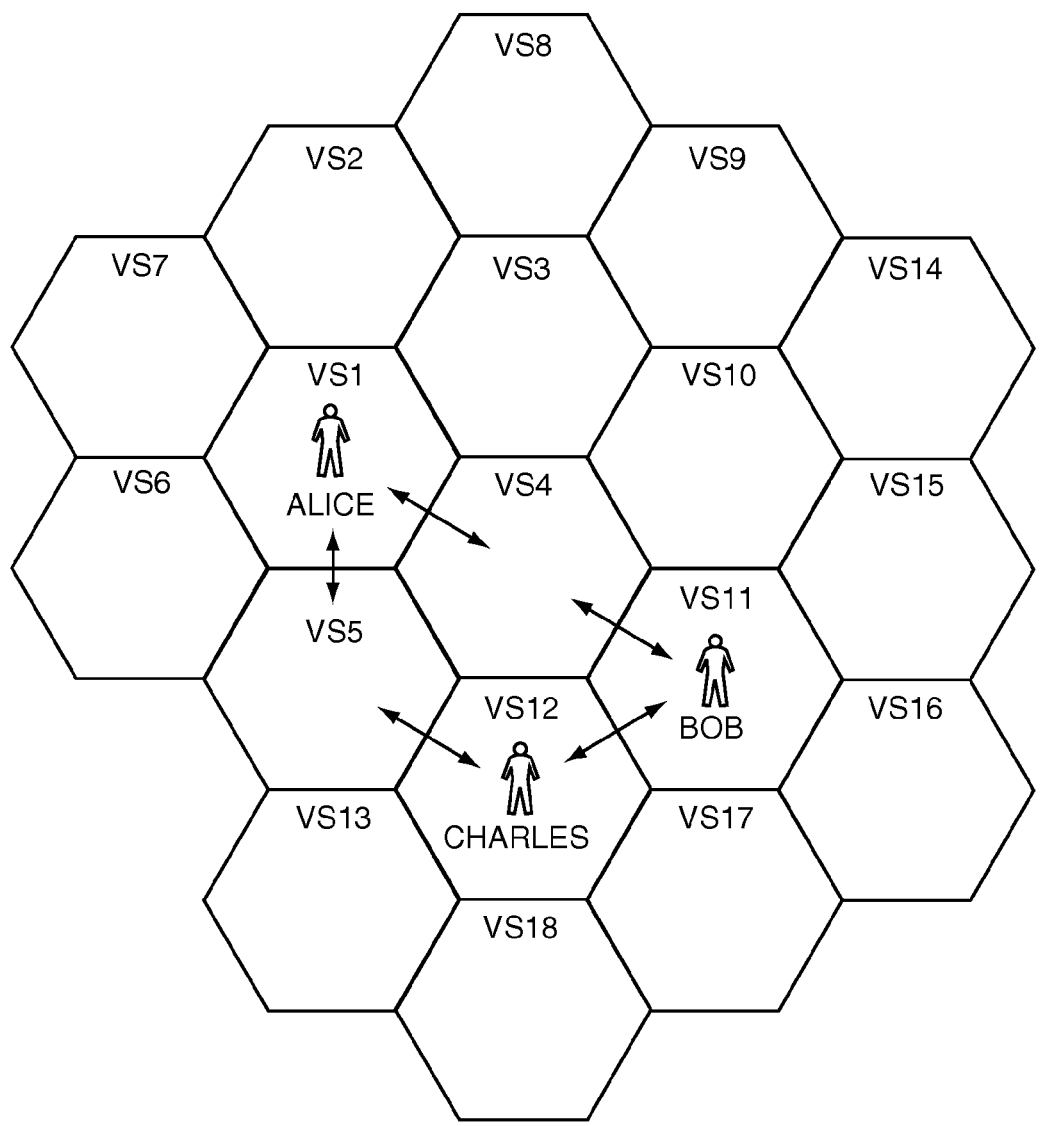

FIG. 8D illustrates the resultant message flow paths for the propagation of messages consumed and produced by the avatars of the users Alice, Bob, and Charles. Messages produced by the avatar of the user Alice are provided from the associated client to the peer server 18-1 hosting the virtual space VS1. The peer server 18-1 then routes the messages to the peer servers 18-4 and 18-5 based on its routing table, and the peer servers 18-4 and 18-5 then route the messages to the peer servers 18-11 and 18-12, respectively, based on their routing tables. The peer server 18-11 then routes the messages to the client associated with the avatar of the user Bob. Likewise, the peer server 18-12 routes the messages of interest to the client associated with the avatar of the user Charles.

In a similar fashion, messages produced by the avatar of the user Bob that are of message types consumed by the avatar of the user Alice are routed from the peer server 18-11 to the peer server 18-1 via the peer server 18-4. The peer server 18-1 then routes the messages to the client associated with the avatar of the user Alice. Likewise, messages produced by the avatar of the user Charles that are of message types consumed the avatar of the user Alice are routed from the peer server 18-12 to the peer server 18-1 via the peer server 18-5. The peer server 18-1 then routes the messages to the client associated with the avatar of the user Alice.

Note that either in response to an advertisement record for the avatar of the user Alice, in response to receiving advertisement records for message types produced by the avatar of the user Alice, or in response to receiving, for example, visual messages from the avatar of the user Alice, the clients associated with the avatars of the users Bob and Charles may obtain content or information and optionally an application needed to render the avatar of the user Alice.

Another feature that may be provided by the present invention is predictive ad/sub messages. More specifically, referring to FIG. 8D, if Bob controls his avatar such that it begins to move toward the virtual space VS10, the peer server 18-11 may calculate an estimated time of arrival in the virtual space VS10 and issue a predictive ad/sub message specifically addressed to the peer server 18-10 enabling the peer server 18-10 to subscribe to message types consumed by Bob's avatar and/or message types produced by Bob's avatar in anticipation for the arrival of Bob's avatar in the virtual space VS10.

As a more complex example, Alice's avatar may use binoculars to explore distant parts of the virtual world. As such, the peer server 18-1 would need to determine the focal point of the binoculars, discover the peer server hosting the corresponding virtual space, and subscribe to visual message types and event messages from that virtual space. The focal point of the binoculars now defines the AOI for Alice's avatar with respect to those message types. Assume that Alice is looking southeast and the focal point of the binoculars is in the virtual space VS16. This may lie outside of the normal AOI. Thus, in one embodiment, the peer server 18-1 may issue, for example, a vector addressed subscription message in the direction of the peer server 18-16. The subscription message may be vector addressed by, for example, defining the scope(s) of the subscription record(s) as the focal point of the binoculars. As such, the peer servers 18-4 and 18-11 simply update their routing tables and forward the subscription message on to the peer server 18-16. When the peer server 18-16 receives the subscription message, it updates its routing table and routes the desired message types back to the peer server 18-1. Alternatively, the peer server 18-16 may establish a direct connection to the peer server 18-1.

Now, if Alice turns in the clockwise direction still looking through the binoculars, the peer server 18-1 may predict that the focal point will soon be looking at the virtual space hosted by the peer server southeast of the virtual space hosted by the peer server 18-16. As such, the peer server 18-1 may issue a predictive vector addressed subscription message to the peer server 18-17. The predictive vector addressed subscription message may be for all concerned message types or only for content message types since content message types typically take the most time to transfer. In an alternative embodiment, the peer server 18-1 may instruct the peer server 18-16 to issue the predictive vector addressed subscription message to the peer server 18-17.

Another feature that may be provided is specifically addressed ad/sub messages. While this is discussed above with respect to the binoculars example, there are other scenarios where specifically addressed ad/sub messages may be desirable. For example, if two users are interacting via a social communication session such as a teleconference, instant messaging or chat session, or the like, a corresponding ad/sub message may be specifically addressed from the peer server hosting the client of one of the users to the peer server hosting the client of the other user.

FIG. 9 illustrates a block diagram of an exemplary embodiment of the peer server 18-1. However, the following discussion is equally applicable to the other peer servers 18-2 through 18-N. Note that in FIG. 9 dashed lines are used to indicate the flow of messages whereas solid lines are used to indicate the flow of data. The peer server 18-1 generally includes a virtual world engine 24, an interest manager 26, and a peer message handler 28, each of which may be implemented in software, hardware, or a combination thereof. The virtual world engine 24 operates to perform typical virtual world operations such as rendering the virtual space including locally hosted virtual objects 30 at client devices, such as client device 20-X, associated with users having avatars within the virtual space hosted by the peer server 18-1. The peer server 18-1 stores or otherwise has access to virtual space properties 32 such as, for example, terrain and weather information enabling the virtual world engine 24 to render the virtual space.

Interest expressions for the locally hosted virtual objects 30 are registered with the peer server 18-1 and stored in a registered interests database 34. The interest manager 26 operates to aggregate the interest expressions of the locally hosted virtual objects 30 from the registered interests database 34 to provide an interest map for the peer server 18-1. In one embodiment, the interest map includes an entry for each message type produced by one or more of the locally hosted virtual objects 30, where each entry includes the message type, an aggregate scope for the message type, and a listing of virtual objects that produce the message type. The interest manager 26 generates the aggregate scope for each message type produced by one or more of the locally hosted virtual objects 30 by aggregating or combining the auras of those virtual objects for the message type from their interest expressions. The interest map also includes an entry for each message type consumed by one or more of the locally hosted virtual objects 30, wherein each entry includes the message type, an aggregate scope for the message type, and a listing of virtual objects that consume the message type. The interest manager 26 generates the aggregate scope for each message type consumed by one or more of the locally hosted virtual objects 30 by aggregating or combining the AOIs of those virtual objects for the message type from their interest expressions.

The peer message handler 28 includes a message receiver 36 that receives messages from the neighboring peer servers 18-2 through 18-7 of the peer server 18-1. An ad/sub message processing and propagation function 38 operates to process and, if appropriate, propagate ad/sub messages received from its neighboring peer servers 18-2 through 18-7 via the message receiver 36 and to update routing table 40 in the manner described above. In addition, the ad/sub message processing and propagation function 38 operates to generate and send ad/sub messages originating at the peer server 18-1 based on the interest map and further update the routing table 40 in the manner described above in order to establish message flow paths for messages produced and consumed by the locally hosted virtual objects 30.

A message routing function 42 operates to route ad/sub messages originating from the peer server 18-1 or further propagate ad/sub messages received by the peer server 18-1 based on the routing table 40. In addition, the message routing function 42 operates to route messages produced by the locally hosted virtual objects 30 to one or more of the neighboring peer servers 18-2 through 18-7 that have expressed an interest in those message types in response to the ad/sub message originating from the peer server 18-1. The message routing function 42 also operates to route messages received from the neighboring peer servers 18-2 through 18-7 according to the routing table 40. More specifically, the routing table 40 is maintained such that messages from the neighboring peer servers 18-2 through 18-7 of message types of interest to the locally hosted virtual objects 30 are routed to the locally hosted virtual objects 30. In addition, messages from, for example, the neighboring peer server 18-2 of message types of interest to others of the neighboring peer servers 18-3 through 18-7 are routed to those peer servers. The messages from the message routing function 42 are sent to the desired ones of the peer servers 18-2 through 18-7 by a message sender 44.

FIG. 10 illustrates a further optimization of the message propagation system of the present invention. In general, the peer servers 18-1 through 18-N may further operate to directly or indirectly transform the content of messages propagated among the peer servers 18-1 through 18-N in a manner that is consistent with the states and properties of their virtual spaces. In this example, it is raining in the virtual space VS4 hosted by the peer server 18-4. The weather conditions in the virtual space VS4 are included as a part of the state of the virtual space VS4. The rain should affect the visibility of objects through the virtual space VS4 such as, for example, the visibility of Alice's avatar in the virtual space VS1 to Bob's avatar in the virtual space VS11. Thus, as discussed below, the peer server 18-4 applies transformation rules such that, for example, the content of visual or audio messages relating to Alice's avatar is transformed to be consistent with the rain. As used herein, visual messages are messages including visual content, referencing visual content, or otherwise related to visual content. Likewise, audio messages are messages include audio content, referencing audio content, or otherwise related to audio content. For instance, the details of Alice's avatar may be obscured, rain may be overlaid on Alice's avatar, or the like. Similarly, the rain should affect sounds. For example, the rain may affect how sounds such as speech originating at Alice's avatar are heard or perceived by Bob's avatar and possibly Charles's avatar in the virtual space VS12. As such, the peer server 18-4 applies transformation rules such that, for example, sounds originating from Alice's avatar are transformed when provided to Bob's avatar to be consistent with the rain. For example, the sound of rain may be mixed with the sound from Alice's avatar. Further, as discussed below, the peer server 18-12 may not be in the propagation path of the peer server 18-4. However, to maintain consistency, the peer server 18-4 may propagate transformation rules resulting from the rain to the peer server 18-12, which may then apply the transformation rules.

Also, in this example, the virtual space VS5 hosted by the peer server 18-5 includes a ravine that affects sounds by, for example, causing an echo. As such, the peer server 18-5 generates one or more corresponding transformation rules and applies the transformation rules to messages propagated through the virtual world such that the contents of the messages are transformed to be consistent with the ravine. For example, the peer server 18-5 may generate a transformation rule for audio messages such that an echo is added to audio messages from Alice's avatar when heard by Charles's avatar and possibly Bob's avatar.

FIGS. 11A-11C describe the message transformation process with respect to FIG. 10 in more detail. FIG. 11A illustrates the message flow path for messages from the client associated with Alice's avatar to the clients associated with the avatars of Bob and Charles. The message flow path may be established using an ad/sub message in the manner described above. However, the present invention is not limited thereto.

FIG. 11B illustrates the application of transformation rules to messages including visual content, or visual messages, according to one embodiment of the present invention. With respect to Alice's avatar, the rain in the virtual space VS4 affects visual messages within an affected area (A) of the virtual world. In this example, the affected area (A) is determined based upon line-of-sight (LOS). However, the present invention is not limited thereto. In operation, the peer server 18-1 receives a message (M) including or referencing visual content from the client associated with Alice's avatar and routes the message to the peer server 18-4 according to the message flow path for the message. Upon receiving the message, the peer server 18-4 identifies one or more transformation rules applicable to the message and applies the transformation rules to the message such that the visual content of the message is transformed by the peer server 18-4, a subsequent peer server in the message flow path, or a client in receipt of the message in a manner that is consistent with the rain. For example, the transformation rule may obscure the details of the visual content such that Alice's avatar appears to be obscured by the rain and/or to overlay rain on the visual content. The details of Alice's avatar may be obscured by, for example, adjusting its opacity. The one or more transformation rules may be generated by the peer server 18-4 prior to receiving the message or in response to receiving the message.

In this example, the peer server 18-4 has at least some basic knowledge about the size and shape of its neighboring peer servers and the message flow path for the message. As such, the peer server 18-4 determines that that message is to be propagated to the peer server 18-11 hosting the virtual space VS11 and that the virtual space VS11 and the virtual spaces of any further peer servers downstream from the peer server 18-11 in the message flow path for the message are within the affected area (A). As such, the peer server 18-4 applies the one or more transformation rules to the message to provide a transformed message (M'). The peer server 18-4 then sends the transformed message (M') to the peer server 18-11, which in turn provides the transformed message (M') to the client associated with Bob's avatar. As a result, Alice's avatar is perceived by Bob's avatar in a manner that is consistent with the rain in the virtual space VS4.

The peer server 18-4 also determines that the message is to be routed to the peer server 18-12 hosting the virtual space VS12 and that only a portion of the virtual space VS12 is within the affected area (A). As such, rather than applying the one or more transformation rules to the message directly, the peer server 18-4 provides the original message (M) and the one or more transformation rules (TR) for the message to the peer server 18-12. The one or more transformation rules may be attached or appended to the message or provided to the peer server 18-12 in one or more separate messages. In this example, since Charles's avatar is not within the affected area (A), the peer server 18-12 determines that the one or more transformation rules do not apply and provides the message to the client associated with Charles's avatar. However, if Charles's avatar were within the affected area (A), the peer server 18-12 would then apply the one or more transformation rules to the message to provide a transformed message and provide the transformed message to the client associated with Charles's avatar. Alternatively, the peer server 18-12 may provide the message and the transformation rules to the client associated with Charles's avatar, where the client may then apply the transformation rule when rendering the virtual world.

While FIG. 11B illustrates either directly applying transformation rules to the message to provide a transformed message or propagating both the original message and the transformation rules for the message, these two scenarios may be combined. More specifically, the peer server 18-4 may transform a message using one or more transformation rules and then propagate the transformed message and one or more additional transformation rules.

FIG. 11C illustrates the application of transformation rules to messages including audio content according to one embodiment of the present invention. The rain in the virtual space VS4 affects audio messages within an affected area ($A_{RAIN}$) of the virtual world. In this example, the affected area ($A_{RAIN}$) is a defined area surrounding the rain. Note that the affected area ($A_{RAIN}$) may be defined in any manner. For example, the affected area ($A_{RAIN}$) may be defined as a circular area having a central point of the rain as its origin and a defined radius, a range of coordinates, a range of virtual spaces such as one virtual space beyond the virtual space VS4, or the like. Similarly, the ravine in the virtual space VS5 affects audio messages within an affected area ($A_{RAVINE}$) by, for example, causing an echo.

In operation, the peer server 18-1 receives a message (M) including audio content from the client associated with Alice's avatar and routes the message to the peer server 18-4 according to the message flow path for the message. Upon receiving the message, the peer server 18-4 identifies one or more transformation rules applicable to the message and applies the transformation rules to the message such that the audio content of the message is transformed by the peer server 18-4, a subsequent peer server in the message flow path, or a client in receipt of the message in a manner that is consistent with the rain. For example, the transformation rule may mix the sound of rain with the audio content. The one or more transformation rules may be generated by the peer server 18-4 prior to receiving the message or in response to receiving the message. In addition, transformation rules may be received from other peer servers such as, for example, the peer server 18-5.

In this example, the peer server 18-4 has at least some basic knowledge about the size and shape of its neighboring peer servers and the message flow path for the message. As such, the peer server 18-4 determines that that message is to be propagated to the peer server 18-11 hosting the virtual space VS11 and that the virtual space VS11 and the virtual spaces of any further peer servers downstream from the peer server 18-11 in the message flow path for the message are within the affected area ($A_{RAIN}$). As such, the peer server 18-4 applies the one or more transformation rules for the rain to the message to provide a transformed message (M').

In addition, even though the audio message does not flow through the virtual space VS5, the ravine may still affect the audio message. As such, at some point either prior to the issuance of the audio message or in response to receiving the audio message from the peer server 18-1, the peer server 18-5 provides one or more transformation rules (TR) associated with the ravine to the peer server 18-4. The peer server 18-4 may then determine that not all but at least a portion of the virtual space VS11 is within the affected area ($A_{RAVINE}$) associated with the ravine. As such, the peer server 18-4 sends the transformed message (M'), which has been transformed based on the transformation rules associated with the rain, and the one or more transformation rules associated with the ravine to the peer server 18-11. The transformation rules associated with the ravine may be appended to the transformed message (M') or provided in one or more separate messages.

Since Bob's avatar is not within the affected area ($A_{RAVINE}$), the peer server 18-11 provides the transformed message (M') to the client associated with Bob's avatar. As a result, the audio content is heard or perceived by Bob's avatar in a manner that is consistent with the rain in the virtual space VS4. Note that if Bob's avatar were in the affected area ($A_{RAVINE}$), the peer server 18-11 may further transform the audio content of the message according to the transformation rules associated with the ravine such that the audio content is consistent with both the rain in the virtual space VS4 and the ravine in the virtual space VS5. Alternatively, the peer server 18-11 may provide the transformed message (M') and the transformation rules for the ravine to the client associated with Bob's avatar. The client may then apply the transformation rules for the ravine to the message when rendering the virtual world.

The peer server 18-4 also determines that the message is to be routed to the peer server 18-12 hosting the virtual space VS12 and that the virtual space VS12 is entirely within the affected area ($A_{RAVINE}$) as well as the affected area ($A_{RAVINE}$). As such, the peer server 18-4 applies the transformation rules for the rain and the ravine to the message to provide a transformed message (M') and provides the transformed message to the peer server 18-12. The peer server 18-12 then provides the transformed message to the client associated with Charles's avatar such that the audio content is heard or perceived by Charles's avatar in a manner that is consistent with both the rain in the virtual space VS4 and the ravine in the virtual space VS5. In an alternative embodiment, the peer server 18-4 does not receive the transformation rules associated with the ravine from the peer server 18-5 before transforming the message based on the transformation rules for the rain and propagating the transformed message to the peer server 18-12. As such, if the peer server 18-12 has received the transformation rules for the ravine from the peer server 18-5 prior to receiving the transformed message from the peer server 18-4, the peer server 18-12 may then further transform the message based on the transformation rules associated with the ravine. Otherwise, the peer server 18-12 provides the transformed message from the peer server 18-4 to the client associated with Charles's avatar. If the peer server 18-12 subsequently receives the transformation rules for the ravine from the peer server 18-5, the peer server 18-12 stores those transformation rules for application to subsequent messages.

In the examples above, the peer server 18-5 transforms the content of the messages in certain circumstances. However, in an alternative embodiment, the peer server 18-5 may indirectly apply transformation rules for all messages by propagating the transformation rules either as part of the message or in association with the message. It should also be noted that, in one embodiment, the peer server 18-11, for example, stores the transformation rules for messages it receives from the peer server 18-4. As such, the peer server 18-4 may propagate a message and one or more transformation rules for the message to the peer server 18-4. Thereafter, for messages of the same message type and optionally from the same source location, the peer server 18-4 propagates only the messages since the peer server 18-11 already has the applicable transformation rules. The peer server 18-4 may periodically update the transformation rules stored by the peer server 18-11 or update the transformation rules as necessary.

While the examples above focus on transforming visual and audio content of messages, the present invention is not limited thereto. The present invention is applicable to any type of message that is affected by the state or properties of the virtual spaces hosted by the peer servers 18-1 through 18-N. Further, the types of messages and the manner in which the messages are transformed may depend on the particular implementation of the virtual world.

FIG. 12 illustrates the message transformation process according to one embodiment of the present invention. First, the peer server 18-1 establishes default message flow paths for message types produced and optionally consumed by virtual objects, such as Alice's avatar, within the virtual space VS1 hosted by the peer server 18-1 (step 500). In one embodiment, the peer server 18-1 establishes the message flow paths by issuing an ad/sub message, as discussed above. However, the present invention is not limited thereto. Next, the peer server 18-1 receives a message from the client associated with Alice's avatar (step 502). In one embodiment, the message includes information identifying the message type of the message, the coordinates of the virtual object that produced or otherwise triggered the message, a reference to the virtual object that produced or otherwise triggered the message, and a maximum scope of the message. The peer server 18-1 then routes the message to one or more of its neighboring peer servers 18-2 through 18-7 according to the message flow path for the message type (step 504). In this example, the peer server 18-1 routes the message to the peer server 18-4.

The peer server 18-4 receives the message from the peer server 18-1 (step 506). In response, the peer server 18-4 identifies one or more transformation rules for the message (step 508). Note that while the discussion herein focuses on receiving the message from the peer server 18-1 and identifying transformation rules for the message from the peer server 18-1, the present invention is not limited thereto. The peer server 18-4 may similarly receive a message from one of its clients and identify transformation rules for the message from the client. The one or more transformation rules may be identified by generating the one or more transformation rules in response to the message, selecting the one or more transformation rules from a number of transformation rules previously generated by the peer server 18-4, selecting the one or more transformation rules from a number of transformation rules proactively generated by the peer server 18-4, or the like, or any combination thereof. In general, the transformation rules are defined such that the message or the content of the message is transformed in a manner that is consistent with the state and/or properties of the virtual space VS4. In addition, the transformation rules for the message may be selected from a number of transformation rules, or remote transformation rules, received from neighboring peer servers. The remote transformation rules may be applied such that the message is also consistent with the states and properties of surrounding virtual spaces including, but not limited to, the neighboring virtual spaces.

In one embodiment, the peer server 18-4 generates one or more transformation rules for the message in response to receiving the message. The transformation rules may then be persisted for use with subsequent messages to which they are applicable and optionally propagated to neighboring peer servers hosting virtual spaces in which the transformation rules are or may be applicable. The peer server 18-4 generates the one or more transformation rules based on the state of the virtual space VS4, the properties of the virtual space VS4, the message type of the message, or a combination thereof. The state of the virtual space VS4 includes, for example, weather conditions such as rain, snow, fog, and the like. The properties of the virtual space VS4 include, for example, the terrain of the virtual space, where the terrain may be formed by or include any number of virtual objects such as, for example, animals, trees, buildings, storm clouds, or the like. In addition, the peer sever 18-4 may consider coordinates or other information identifying the location of the producer or source of the message, which in this example is Alice's avatar; knowledge of the virtual world such as the sizes and shapes of the virtual spaces in the virtual world or a subset thereof, or any combination thereof. The coordinates of the source of the message are relevant when the affected area for the transformation depends on the source location.

More specifically, in one embodiment, a profile may be defined for each known message type. The profile generally includes a description of the message type; a listing of known virtual space properties and/or states, which are also referred to as virtual space parameters, that affect the message type; and information defining the manner in which the message type is affected by or is to be transformed by the known virtual space parameters that affect the message type. For example, the profile for the visual message type may indicate that visual messages are affected by rain and that visual messages affected by rain are to be transformed by adjusting the opacity of the visual content of the visual messages by X %, where X may be defined in any manner and may or may not be configurable. For example, X may be related to the intensity of the rain. The profiles of the message types may be known to all of the peer servers 18-1 through 18-N; accessible to the peer servers 18-1 through 18-N from, for example, a central database; provided within messages of those message types as metadata; or the like. As such, when generating the transformation rules, the peer server 18-4 may use the message profile of the message to determine whether the state or virtual properties of the virtual space VS4 affect the message type. If so, the peer server 18-4 generates the appropriate transformation rule(s).

In one embodiment, the one or more transformation rules include information defining how the message is to be transformed and information identifying the affected area of the virtual world. The affected area may be defined in association with the corresponding state or property such as, for example, a circular region having a radius R about a defined point. Alternatively, the affected area may depend on source location. For example, the affected area for visual messages with respect to the rain illustrated in FIG. 11B depends on the source location. As such, the affected area may be determined or computed based on the location of the source of the message. The transformation rule may also include a source location identifying an area of the virtual world, where the transformation rule is applicable to messages of the corresponding message type originating in the source location. This information is particularly beneficial if the transformation rule is persisted for later use and the affected area for the transformation has been determined for a particular source location. In another embodiment, the one or more transformation rules include information identifying the virtual space parameters of the virtual space VS4 that affect the message rather than the information defining how the message is to be transformed. Subsequent peer servers or clients may then apply the transformation rule based on the profile of the message type, which defines how the message is to be transformed in response to the identified virtual space parameters.

Note that the use of profiles of the message types is exemplary and not intended to limit the scope of the present invention. The peer server 18-4 may generate the one or more transformation rules for the message without using a message profile. For example, the peer server 18-4 may have knowledge of how the state and/or properties of the virtual space VS4 affect message types. More specifically, returning to the rain example, the peer server 18-4 may store or have access to information identifying message types affected by the rain and optionally how the rain is to transform those message types. Thus, the peer server 18-4 may store or have access to information stating that rain affects visual messages and optionally that rain affects visual messages by adjusting the opacity of virtual objects by X %, where X may be defined in any manner and may or may not be configurable. For example, X may be related to the intensity of the rain.

In another embodiment, the peer server 18-4 proactively generates transformation rules based on the state and/or properties of the virtual space VS4. More specifically, in one embodiment, the peer server 18-4 generates one or more transformation rules for each of a number of message types affected by the state and/or properties of the virtual space VS4. In addition, if the affected area depends on the source location, the peer server 18-4 generates transformation rules for each of a number of source locations. The source locations may be virtual spaces hosted by other peer servers such as, but not limited to, the neighboring peer servers of the peer server 18-4; coordinates or ranges of coordinates within the virtual world; or other defined areas of the virtual world.

Thus, returning to the example of FIG. 11B, the peer server 18-4 may proactively generate a transformation rule stating that visual messages originating from virtual objects such as avatars within a defined area of the virtual space VS1 are to be transformed such that the details of the virtual object are obscured by, for example, adjusting the opacity of the virtual object and rain is overlaid on the virtual object when delivered to consumers located within an affected area. The affected area is the area of the virtual world for which visual messages originating from the defined area for the transformation rule are affected by the rain in the virtual space VS4. Note that for some types of messages, such as messages including visual content, the affected area may vary depending on the source location. Again using the rain of FIG. 11B as an example, the affected area for visual messages originating in the virtual space VS1 is different than the affected area for visual messages originating in the virtual space VS3.

In the case of proactively generated transformation rules, the peer server 18-4 identifies the one or more transformation rules for the message by selecting one or more transformation rules that are applicable to the message from the proactively generated rules. The transformation rules may be selected based on the message type of the message and the location from which the message originated.

While many types of transformation rules will be apparent to one of ordinary skill in the art, a few examples are as follows. The transformation rules may reduce the resolution or quality of visual or audio content to remove details that are unnecessary or imperceptible to downstream peer servers, manipulate audio or video content to be consistent with the virtual space parameters, perform media specific filtering to filter or remove specific types of content such as filtering visual content from audio-visual content, or perform message reflection or redirection.

More specifically, the transformation rules may reduce graphical details of the visual content of visual messages. This may be desirable when, for example, the view of a virtual object is being obscured by rain, fog, or the like. The transformation rules may generate a mirror image of the visual content of a visual message. This may be beneficial where there is a virtual object having a reflective property such as, for example, a mirror, window, or the like. The transformation rules may scale the visual content of a visual message up or down. This may be beneficial where a virtual object is viewed from a distance, viewed via binoculars, or the like. The transformation rules may crop or remove parts of the visual content of a visual message. This may be beneficial where the view of a virtual object is partially obstructed. The transformation rules may reduce the volume or quality of audio content of an audio message. For example, reducing the volume may be beneficial where a sound is heard from a distance. Reducing the quality of the audio content may be performed by re-encoding the audio content using higher compression or a reduced bit-rate. This may be beneficial where the reduced quality is imperceptible or sufficient for the needed purpose. The transformation rules may similarly re-encode any type of multimedia content with a different or reduced bit-rate. The transformation rules may reflect messages such as, for example, reflecting visual content messages from a mirror or reflecting audio content from some virtual object having a reflective property with respect to audio content. The transformation rules may truncate or filter specific segments of the content of the message. This may be beneficial when creating an echo. The transformation rules may replace all or a portion of the content of a message with given content. For example, an audio communication link having static may be simulated by replacing segments of an audio stream with white noise or static. The transformation rules may insert or append content to the content of a message. For example, in order to create an echo, content creating the echo may be appended to the end the audio content of a message. The transformation rules may overlay or mix content with the content of a message. The transformation rules may filter a specified spectrum from the content. This may be beneficial where, for example, an object is viewed through blue glass. Other colors, or frequencies, may be filtered from the content and replaced with corresponding shades of blue. As a final example, the transformation rules may be used to reduce the number of layers in a layered content representation based on distance. Layered content representations are disclosed in commonly owned and assigned U.S. patent application Ser. No. 11/678,798, entitled LAYERED VISUALIZATION OF CONTENT REPRESENTATIONS, which was filed on Feb. 26, 2007 and is hereby incorporated by reference in its entirety.

Note that the transformation rules may contain programming language constructs such as loops and logical conditions. For example, a transformation rule for generating an echo may include the appropriate constructs to enable the echo to be generated.

Returning to FIG. 12, once the one or more transformation rules for the message are identified, the peer server 18-4 effects application of the one or more transformation rules to the message before propagating the message to one or more of its neighboring peer servers and/or one or more of its clients (step 510). More specifically, the peer server 18-4 may directly apply the one or more transformation rules to transform the content of the message. The peer server 18-4 may directly apply a transformation rule when, for example, the message contains the pertinent content to be transformed and the virtual space of the neighboring peer server to which the message is to be propagated and the virtual spaces of any peer servers downstream of the neighboring peer server in the message flow path are within the affected area for the transformation rules. The peer server 18-4 may also directly apply a transformation rule when the message contains a reference to the content to be transformed. For example, the peer server 18-4 may use the reference to obtain the content and then transform the content based on the transformation rule. The transformed content may then be stored in the message, or a reference to the transformed message at the peer server 18-4 may be inserted into the message. Alternatively, the peer server 18-4 may propagate the message and the one or more transformation rules according to the message flow path for the message. This may be used when, for example, the pertinent content to be transformed is not contained in the message or if the virtual space of the neighboring peer server to which the message is to be propagated or the virtual spaces of any peer servers downstream of the neighboring peer server in the message flow path is not entirely within the affected area. The one or more transformation rules may be appended to the message or provided separately. The transformation rules may thereafter be applied to the message by downstream peer servers or clients.

FIGS. 13A and 13B illustrate a message transformation process for generating transformation rules in response to ad/sub messages according to one embodiment of the present invention. First, the peer server 18-1 generates and issues an ad/sub message in the manner described above (step 600). The peer server 18-4 receives the ad/sub message (step 602). In response to the ad/sub message, the peer server 18-4 generates one or more transformation rules for the message types identified in the ad/sub message (step 604). The peer server 18-4 may generate transformation rules for only the message types identified by the advertisement records of the ad/sub message, only the message types identified by the subscription records of the ad/sub message, or both. As discussed above, the peer server 18-4 generates the transformation rules based on the state of the virtual space, the properties of the virtual space, or a combination thereof. In addition, the locations of the sources of the message types in the virtual world may be used to determine the affected areas for the transformation rules. With respect to the message types identified by the advertisement records in the ad/sub message, the locations of the sources of the message types within the virtual space VS1 may be identified by the advertisement records. Alternatively, the virtual space VS1 may be used as the source location.

In this example, the peer server 18-4 then propagates the ad/sub message to one or more of its neighboring peer servers in the manner discussed above (step 606). The peer server 18-4 then determines whether any of the transformation rules should be propagated to any of its neighboring peer servers (step 608). If not, the process proceeds to step 612. If so, the peer server 18-4 then propagates the transformation rules to one or more of its neighboring peer servers to which the transformation rules are or may be relevant. In an alternative embodiment, the peer server 18-4 may attach relevant transformation rules to the ad/sub message propagated to one or more of its neighboring peer servers downstream of the peer server 18-4 in the propagation path for the ad/sub message. The peer server 18-4 may then determine whether any of the transformation rules should also be propagated to any of the neighboring peer servers that are not downstream of the peer server 18-4 in the propagation path of the ad/sub message. Returning to the example of FIG. 11C, the peer server 18-4 may attach the transformation rule associated with the rain to the ad/sub message when propagating the ad/sub message to the peer server 18-11. The peer server 18-4 may then propagate the transformation rule for the rain to the peer server 18-12, which is not downstream of the peer server 18-4 in the propagation path of the ad/sub message.

In response to the propagation of the ad/sub message, the peer server 18-4 receives responses to the ad/sub message from one or more of its neighboring peer servers (step 612) and updates its routing table based on the responses as described above (step 614). The peer server 18-4 then generates and sends a response to the ad/sub message to the peer server 18-1 (step 616). The peer server 18-1 receives the response (step 618), and based on the response, the peer server 18-1 updates its routing table (FIG. 13B, step 620). At this point, the message flow paths for the message types identified in the ad/sub message are established. In addition, the transformation rules for the message types identified in the ad/sub message have been generated.

At some point thereafter, the peer server 18-1 receives a message from a client associated with an avatar within the virtual space VS1 (step 622). Note that the message may alternatively be received from any virtual object within the virtual space VS1. In response, the peer server 18-1 routes the message to the peer server 18-4 according to the message flow path for the corresponding message type (step 624). The peer server 18-4 receives the message (step 626) and identifies one or more transformation rules, if any, that are applicable to the message (step 628). The peer server 18-4 then applies the one or more transformation rules to the message (step 630). The peer server 18-4 may apply the one or more transformation rules directly by transforming the content of the message or indirectly by propagating the transformation rules with the message. Note that if the message contains a reference to content, the peer server 18-4 may fetch the content using the reference and apply the one or more transformation rules directly to the content to provide the transformed message or apply the one or more transformation rules indirectly by propagating the transformation rules with the message. The message and optionally the one or more transformation rules for the message are then routed to one or more of the neighboring peer servers of the peer server 18-4 according to the message flow path for the message type (step 632).

FIG. 14 is a block diagram of the peer server 18-1 implementing the message transformation scheme according to one embodiment of the present invention. Note that this discussion is equally applicable to the other peer servers 18-2 through 18-N. In general, the peer server 18-1 is substantially the same as the peer server 18-1 illustrated in FIG. 9. However, in this embodiment, the peer message handler 28 further includes a transformation function 46 and transformation rules 48. In operation, the transformation function 46 generates the transformation rules 48 based on the state and properties of the virtual space VS1 hosted by the peer server 18-1 obtained from the virtual world engine 24. In addition, the transformation rules 48 may include transformation rules received from neighboring peer servers that may be relevant to messages in or propagated through the virtual space VS1. As discussed above, the transformation function 46 may generate the transformation rules in response to receiving a message from a neighboring peer server, in response to receiving an ad/sub message from a neighboring peer server, or proactively. In addition, during message propagation, the transformation function 46 operates to identify one or more transformation rules, if any, that are applicable to the message and effects application of the one or more transformation rules to the message. The transformation function 46 may apply the transformation rules to transform the content of the message or propagate the transformation rules along with the message.

FIGS. 15A and 15B illustrate the operation of the transformation function 46 of FIG. 14 according to one embodiment of the present invention. First, the transformation function 46 receives a message (step 700). In the exemplary embodiment of FIG. 14, the transformation function 46 receives the message from the message routing function 42. Upon receiving the message, the transformation function 46 determines whether the message is a property or state update message from the virtual world engine 24 (step 702). If so, the transformation function 46 updates any affected transformation rules and generates any new transformation rules resulting from the update to the property or state of the virtual space VS1 (step 704). The updated or new transformation rules are stored for subsequent use. The transformation function 46 then determines whether any of the updated or new transformation rules need to be propagated (step 706). If not, the process ends. If so, the transformation function 46 propagates the updated or new transformation rules (step 708), and then the process ends. In one embodiment, the transformation function 46 operates such that any updated transformation rules are propagated to any neighboring peer servers to which the transformation rules were previously propagated. The transformation function 46 may, for example, propagate new transformation rules to one or more of its neighboring peer servers to which the transformation rules are or may be applicable.

Returning to step 702, if the message is not a property or state update message, the transformation function 46 then determines whether the message is an ad/sub message (step 710). If so, the transformation function 46 gets or obtains the first record in the ad/sub message (step 712) and generates one or more transformation rules for the corresponding message type, if applicable (step 714). The transformation rules are then stored. The transformation function 46 then determines whether to propagate the transformation rules (step 716). If not, the process proceeds to step 720. If so, the transformation function 46 propagates the transformation rules (step 718). The transformation function 46 then determines whether the record is the last record in the ad/sub message (step 720). If so, the process ends. If not, the transformation function 46 gets the next record in the ad/sub message (step 722) and the process returns to step 714 and is repeated until each record in the ad/sub message has been processed.

Returning to step 710, if the message is not an ad/sub message, the transformation function 46 then determines whether the message is a remote transformation rule received from a neighboring peer server (FIG. 15B, step 724). If so, the transformation function 46 determines whether the remote transformation rule is applicable by, for example, determining whether any of the virtual space VS1 hosted by the peer server 18-1 is within the affected area for the transformation rule (step 726). If not, the process ends. If so, the transformation function 46 persists and possibly propagates the remote transformation rule (step 728). The transformation function 46 may propagate the remote transformation rule to one or more of its neighboring peer servers if the remote transformation rule is or may be applicable to the virtual spaces hosted by those neighboring peer servers. The process then ends.

Returning to step 724, if the message is not a remote transformation rule, the transformation function 46 determines whether the message is a content or content update message received from one of its neighboring peer servers (step 730). If not, the process ends. If so, the transformation function 46 identifies one or more transformation rules, if any, that are applicable to the message (step 732) and applies the one or more transformation rules to the message (step 734). The process then ends.

FIG. 16 is a block diagram of the network device 12-1 of FIG. 1 according to one embodiment of the present invention. Note that this discussion is also applicable to other network devices 12-2 through 12-N and 14. In general, the network device 12-1 includes a control system 50. In one embodiment, the peer server 18-1 is at least partially implemented in software and stored in memory 52. However, the present invention is not limited thereto. The peer server 18-1 may be implemented in software, hardware, or a combination thereof. The client 20-1 may also be implemented at least partially in software and stored in the memory 52. However, the present invention is not limited thereto. The network device 12-1 also includes a communication interface 54 communicatively coupling the network device 12-1 to the network 16 (FIG. 1). The network device 12-1 may also include a user interface 56, which may include, for example, a display, speakers, one or more user input devices, and the like.

The present invention provides substantial opportunity for variation without departing from the spirit or scope of the present invention. For example, while the description above focuses on the use of both advertisement and subscription records, the present invention is not limited thereto. As will be apparent to one of ordinary skill in the art, the message flow paths for messages produced and consumed by virtual objects in the virtual worlds may alternatively be established using only subscription messages, where each of the peer servers 18-1 through 18-N issues only subscription messages identifying message types consumed by virtual objects within its virtual space. As another alternative, only advertisement records may be used to establish the message flow paths where each of the peer servers 18-1 through 18-N issues only advertisement messages identifying message types produced by virtual objects within its virtual space. As another example, while the discussion herein focuses on a P2P virtual world, the present invention is equally applicable to any type of distributed virtual world.

Those skilled in the art will recognize improvements and modifications to the preferred embodiments of the present invention. All such improvements and modifications are considered within the scope of the concepts disclosed herein and the claims that follow.

What is claimed is:

1. A method for transforming messages propagated in a distributed virtual world formed by a plurality of peer servers each hosting a virtual space of the distributed virtual world, comprising:
   receiving a message at a first peer server of the plurality of peer servers, wherein the first peer server comprises a processor and hosts a virtual space of the distributed virtual world;
   identifying at least one transformation rule applicable to the message, wherein the at least one transformation rule defines a manner in which the message is to be transformed in order to be consistent with at least one virtual space parameter of the virtual space hosted by the first peer server;
   indirectly applying the at least one transformation rule to the message such that the at least one transformation rule is propagated in association with the message; and
   propagating the message to at least one destination.

2. The method of claim 1 wherein propagating the message to the at least one destination comprises propagating the message to a neighboring peer server hosting a virtual space neighboring the virtual space hosted by the first peer server in the distributed virtual world.

3. The method of claim 1 wherein applying the at least one transformation rule comprises transforming a content of the message based on the at least one transformation rule to provide a transformed message, and propagating the message comprises propagating the transformed message to the at least one destination.

4. The message of claim 3 wherein if the message includes a reference to the content, transforming the content comprises obtaining the content based on the reference.

5. The method of claim 3 wherein propagating the transformed message comprises propagating the transformed message to at least one neighboring peer server hosting a virtual space neighboring the virtual space hosted by the first peer server in the distributed virtual world.

6. The method of claim 3 wherein propagating the transformed message comprises propagating the transformed message to at least one client hosting an avatar within the virtual space hosted by the first peer server.

7. The method of claim 1 wherein propagating the message to the at least one destination comprises propagating the message to a client hosting an avatar within the virtual space hosted by the first peer server.

8. The method of claim 1 wherein receiving the message comprises receiving the message from a neighboring peer server hosting a virtual space neighboring the virtual space hosted by the first peer server in the distributed virtual world.

9. The method of claim 1 wherein receiving the message comprises receiving the message from a client hosting an avatar within the virtual space hosted by the first peer server.

10. The method of claim 1 wherein, based on the at least one transformation rule, a content of the message is subsequently transformed in a manner that is consistent with the at least one virtual space parameter of the virtual space hosted by the first peer server.

11. The method of claim 10 wherein propagating the message comprises propagating the message having the at least one transformation rule indirectly applied thereto to at least one neighboring peer server hosting a virtual space neighboring the virtual space hosted by the first peer server in the distributed virtual world, wherein the message is subsequently transformed by the at least one neighboring peer server based on the at least one transformation rule.

12. The method of claim 10 wherein propagating the message comprises propagating the message having the at least one transformation rule indirectly applied thereto to at least one neighboring peer server hosting a virtual space neighboring the virtual space hosted by the first peer server in the distributed virtual world, wherein the message is subsequently transformed by a client in receipt of the message from the at least one neighboring peer server based on the at least one transformation rule.

13. The method of claim 10 wherein propagating the message comprises propagating the message having the at least one transformation rule indirectly applied thereto to a client hosting an avatar within the virtual space hosted by the first peer server, wherein the message is subsequently transformed by the client based on the at least one transformation rule.

14. The method of claim 1 wherein identifying the at least one transformation rule comprises generating the at least one transformation rule in response to receiving the message based on the at least one virtual space parameter of the virtual space hosted by the first peer server.

15. The method of claim 1 further comprising:
proactively generating a plurality of transformation rules based on the at least one virtual space parameter of the virtual space hosted by the first peer server;
wherein identifying the at least one transformation rule comprises selecting the at least one transformation rule applicable to the message from the plurality of transformation rules.

16. The method of claim 1 wherein receiving the message comprises receiving the message from a sending peer server hosting a virtual space neighboring the virtual space hosted by the first peer server in the distributed virtual world, and prior to receiving the message from the sending peer server, the method further comprises:
receiving a message flow path setup message from the sending peer server, the message flow path setup message comprising information identifying a plurality of message types; and generating a plurality of transformation rules for the plurality of message types based on the at least one virtual space parameter of the virtual space hosted by the first peer server;
wherein identifying the at least one transformation rule comprises selecting the at least one transformation rule applicable to the message from the plurality of transformation rules.

17. The method of claim 1 further comprising:
identifying at least one remote transformation rule applicable to the message, wherein the at least one remote transformation rule defines a manner in which the message is to be transformed in order to be consistent with the at least one virtual space parameter of a virtual space other than the virtual space hosted by the first peer server; and
applying the at least one remote transformation rule to the message.

18. The method of claim 1 further comprising propagating the at least one transformation rule to at least one peer server that is not downstream of the first peer server in a message flow path of the message.

19. The method of claim 1 wherein applying the at least one transformation rule comprises indirectly applying the at least one transformation rule if the message references but does not include content to be transformed based on the at least one transformation rule.

20. The method of claim 1 wherein the at least one transformation rule is generated based on predefined information defining a manner in which the at least one virtual space parameter of the virtual space hosted by the first peer server affects a message type of the message.

21. The method of claim 1 wherein the at least one transformation rule comprises information defining a manner in which messages of a message type of the message are to be transformed and information identifying an affected area of the distributed virtual world in which the at least one transformation rule is relevant.

22. The method of claim 1 wherein the at least one transformation rule comprises information identifying the at least one virtual space parameter and information identifying an affected area of the distributed virtual world in which the at least one transformation rule is relevant, further wherein a manner in which the message is to be transformed is ascertainable based on predefined information defining a manner in which the at least one virtual space parameter affects messages of a message type of the message.

23. A system comprising:
a communication interface communicatively coupling the system to a network; and
a control system comprising a processor and associated with the communication interface and including a peer server hosting a virtual space of a distributed virtual world formed by a plurality of peer servers including the peer server each hosting a virtual space of the distributed virtual world, the peer server adapted to:
receive a message;
identify at least one transformation rule applicable to the message, wherein the at least one transformation rule defines a manner in which the message is to be transformed in order to be consistent with at least one virtual space parameter of the virtual space hosted by the peer server;
indirectly apply the at least one transformation rule to the message such that the at least one transformation rule is propagated in association with the message; and
propagate the message to at least one destination.

24. The system of claim 23 wherein the at least one virtual space parameter comprises at least one of a group consisting of: a state of the virtual space hosted by the peer server and a property of the virtual space hosted by the peer server.

25. The system of claim 23 wherein the control system is further adapted to:
apply the at least one transformation rule to the message by transforming a content of the message based on the at least one transformation rule to provide a transformed message; and
propagate the transformed message.

26. The system of claim 23 wherein the control system is further adapted to apply the at least one transformation rule to the message indirectly.

27. The system of claim 23 wherein the message is received from a client hosting an avatar within the virtual space hosted by the peer server.

28. The system of claim 23 wherein the message is received from a neighboring peer server hosting a virtual space neighboring the virtual space hosted by the peer server in the distributed virtual world.

29. The system of claim 23 wherein the message is propagated to a client hosting an avatar within the virtual space hosted by the peer server.

30. The system of claim 23 wherein the message is propagated to a neighboring peer server hosting a virtual space neighboring the virtual space hosted by the peer server in the distributed virtual world.

31. A method for transforming messages propagated in a distributed virtual world formed by a plurality of peer servers each hosting a virtual space of the distributed virtual world, comprising:
receiving a message at a first peer server of the plurality of peer servers, wherein the first peer server comprises a processor and hosts a virtual space of the distributed virtual world;
identifying at least one transformation rule applicable to the message, wherein the at least one transformation rule defines a manner in which the message is to be transformed in order to be consistent with at least one virtual space parameter of the virtual space hosted by the first peer server and comprises information identifying an affected area of the distributed virtual world to which the at least one transformation rule is relevant;
applying the at least one transformation rule to the message by transforming a content of the message if a virtual space hosted by at least one neighboring peer server to which the message is to be propagated and virtual spaces of any additional peer servers downstream of the at least one neighboring peer server in a message flow path for the message is within the affected area; and
propagating the message to the at least one neighboring peer server hosting a virtual space neighboring the virtual space hosted by the first peer server in the distributed virtual world.

32. A system comprising:
a communication interface communicatively coupling the system to a network; and
a control system comprising a processor and associated with the communication interface and including a peer server hosting a virtual space of a distributed virtual world formed by a plurality of peer servers including the peer server each hosting a virtual space of the distributed virtual world, the peer server adapted to:
receive a message;
identify at least one transformation rule applicable to the message, wherein the at least one transformation rule defines a manner in which the message is to be transformed in order to be consistent with at least one virtual space parameter of the virtual space hosted by the peer server and comprises information identifying an affected area of the distributed virtual world to which the at least one transformation rule is relevant;
apply the at least one transformation rule to the message by transforming a content of the message if a virtual space hosted by at least one neighboring peer server to which the message is to be propagated and virtual spaces of any additional peer servers downstream of the at least one neighboring peer server in a message flow path for the message is within the affected area; and
propagate the message to at least one neighboring peer server hosting a virtual space neighboring the virtual space hosted by the first peer server in the distributed virtual world.

* * * * *